(12) United States Patent
Dou et al.

(10) Patent No.: US 9,238,324 B2
(45) Date of Patent: Jan. 19, 2016

(54) BIAXIALLY ORIENTED POLYLACTIC ACID FILM WITH REDUCED NOISE LEVEL

(75) Inventors: Shichen Dou, Warwick, RI (US); Mark S. Lee, North Kingstown, RI (US); Claudio M. Paulino, South Kingstown, RI (US); Nao Yokota, Saunderstown, RI (US); Keunsuk P. Chang, North Kingstown, RI (US)

(73) Assignee: TORAY PLASTICS (AMERCIA), INC., N. Kingstown, RI (US)

( * ) Notice: Subject to any disclaimer, the term of this patent is extended or adjusted under 35 U.S.C. 154(b) by 0 days.

(21) Appl. No.: 12/977,647

(22) Filed: Dec. 23, 2010

(65) Prior Publication Data

US 2011/0244185 A1    Oct. 6, 2011

Related U.S. Application Data

(60) Provisional application No. 61/319,776, filed on Mar. 31, 2010.

(51) Int. Cl.
  *B32B 1/02*    (2006.01)
  *B32B 15/08*    (2006.01)
  (Continued)

(52) U.S. Cl.
  CPC ........... *B29C 47/065* (2013.01); *B29C 47/0021* (2013.01); *B32B 27/08* (2013.01); *B32B 27/302* (2013.01); *B32B 27/36* (2013.01);
  (Continued)

(58) Field of Classification Search
  CPC  B32B 27/302; B32B 27/36; B32B 2995/006; B32B 2307/31; B32B 2307/518; B32B 2307/7163; B32B 27/08; B29K 2995/006; B29K 2995/0067; B29C 47/0021; B29C 47/065; Y10T 428/24479; Y10T 428/265; Y10T 428/31786; Y10T 428/31681
  USPC ............... 428/35.8, 35.7, 35.9, 458, 220, 332
  See application file for complete search history.

(56) References Cited

U.S. PATENT DOCUMENTS 4,189,419 A    2/1980    Takemoto et al.
4,281,045 A    7/1981    Sumi et al.
(Continued)

FOREIGN PATENT DOCUMENTS

CA    2239671    12/1999
DE    43 13 136    10/1994
(Continued)

OTHER PUBLICATIONS

Cloutier et al., U.S. Office Action mailed Oct. 27, 2011 directed to U.S. Appl. No. 12/542,428; 13 pages.
(Continued)

*Primary Examiner* — Erik Kashnikow
(74) *Attorney, Agent, or Firm* — Morrison & Foerster LLP

(57) ABSTRACT

Described are biaxially oriented polylactic acid (BOPLA) films with a novel formulation that exhibits a softer feel and quieter sound, without jeopardizing film making stability. The films can be used, for example, in packaging applications. The films can be metallized, or combined with barrier coatings or layers, for improved gas barrier properties particularly for moisture vapor transmission barrier desired in packaging applications. The films can also be printing films for packaging applications and may be transparent or matte in appearance. The films have characteristics that are beneficial to converting processes, are economical, and maintain biocompostability similar to typical BOPLA films.

29 Claims, 3 Drawing Sheets

5. (light color) PLA 6. (dark color) Layered structure of Polymer A

(51) Int. Cl.
  *B29C 47/06* (2006.01)
  *B29C 47/00* (2006.01)
  *B32B 27/08* (2006.01)
  *B32B 27/30* (2006.01)
  *B32B 27/36* (2006.01)
  *B29C 47/04* (2006.01)
  *B29K 21/00* (2006.01)
  *B29K 105/00* (2006.01)
  *B29L 9/00* (2006.01)

(52) U.S. Cl.
  CPC ........... *B29C 47/043* (2013.01); *B29C 47/067* (2013.01); *B29K 2021/00* (2013.01); *B29K 2105/256* (2013.01); *B29K 2995/006* (2013.01); *B29K 2995/0067* (2013.01); *B29L 2009/00* (2013.01); *B32B 2255/205* (2013.01); *B32B 2274/00* (2013.01); *B32B 2307/31* (2013.01); *B32B 2307/518* (2013.01); *B32B 2307/54* (2013.01); *B32B 2307/7163* (2013.01); *B32B 2439/70* (2013.01); *Y10T 428/24479* (2015.01); *Y10T 428/265* (2015.01); *Y10T 428/31681* (2015.04); *Y10T 428/31786* (2015.04)

(56) References Cited

U.S. PATENT DOCUMENTS

| | | |
|---|---|---|
| 4,310,578 A | 1/1982 | Katsura et al. |
| 4,379,914 A | 4/1983 | Lundberg |
| 4,410,595 A | 10/1983 | Matsumoto et al. |
| 4,464,438 A | 8/1984 | Lu |
| 4,632,959 A | 12/1986 | Nagano |
| 4,745,171 A | 5/1988 | Sato et al. |
| 4,828,920 A | 5/1989 | Nakabayashi et al. |
| 4,877,685 A | 10/1989 | Bergstrom et al. |
| 5,084,334 A | 1/1992 | Hamano et al. |
| 5,108,807 A | 4/1992 | Tucker |
| 5,147,726 A | 9/1992 | Suzuki et al. |
| 5,153,074 A | 10/1992 | Migliorini |
| 5,155,160 A | 10/1992 | Yeh et al. |
| 5,175,054 A | 12/1992 | Chu |
| 5,192,620 A | 3/1993 | Chu et al. |
| 5,216,050 A | 6/1993 | Sinclair |
| 5,352,716 A | 10/1994 | Chapman et al. |
| 5,359,026 A | 10/1994 | Gruber |
| 5,391,423 A | 2/1995 | Wnuk et al. |
| 5,443,780 A | 8/1995 | Matsumoto et al. |
| 5,444,107 A | 8/1995 | Ajioka et al. |
| 5,473,439 A | 12/1995 | Pappas |
| 5,484,881 A | 1/1996 | Gruber et al. |
| 5,489,474 A | 2/1996 | Shinoda et al. |
| 5,556,711 A | 9/1996 | Ajioka et al. |
| 5,585,191 A | 12/1996 | Gruber et al. |
| 5,631,066 A | 5/1997 | O'Brien |
| 5,631,498 A | 5/1997 | Anschel et al. |
| 5,731,093 A | 3/1998 | Chang et al. |
| 5,849,374 A | 12/1998 | Gruber et al. |
| 5,849,401 A | 12/1998 | El-Afandi et al. |
| 5,908,918 A | 6/1999 | Chen et al. |
| 5,939,467 A | 8/1999 | Wnuk et al. |
| 6,005,068 A | 12/1999 | Gruber et al. |
| 6,033,747 A | 3/2000 | Shiotani |
| 6,080,478 A | 6/2000 | Karhuketo |
| 6,096,431 A | 8/2000 | Matsudaira et al. |
| 6,106,950 A | 8/2000 | Searle et al. |
| 6,121,410 A | 9/2000 | Gruber et al. |
| 6,143,408 A | 11/2000 | Fujita |
| 6,153,276 A | 11/2000 | Oya et al. |
| 6,171,714 B1 | 1/2001 | Bergkessel et al. |
| 6,211,290 B1 | 4/2001 | Xiao et al. |
| 6,248,430 B1 | 6/2001 | Toyoda et al. |
| 6,312,823 B1 | 11/2001 | El-Afandi et al. |
| 6,322,899 B1 | 11/2001 | Karhuketo et al. |
| 6,326,440 B1 | 12/2001 | Terada et al. |
| 6,350,530 B1 | 2/2002 | Morikawa et al. |
| 6,353,086 B1 | 3/2002 | Kolstad et al. |
| 6,444,750 B1 | 9/2002 | Touhsaent |
| 6,472,081 B1 | 10/2002 | Tsai et al. |
| 6,500,556 B1 | 12/2002 | Morris et al. |
| 6,514,602 B1 | 2/2003 | Zhao et al. |
| 6,521,336 B1 | 2/2003 | Narita et al. |
| 6,543,208 B1 | 4/2003 | Kobayashi et al. |
| 6,544,369 B1 | 4/2003 | Kitamura et al. |
| 6,566,426 B1 | 5/2003 | Kanaida et al. |
| 6,600,008 B1 | 7/2003 | Kobayashi et al. |
| 6,649,103 B1 | 11/2003 | Bousmina et al. |
| 6,649,732 B2 | 11/2003 | Kobayashi et al. |
| 6,713,175 B1 | 3/2004 | Terada et al. |
| 6,787,245 B1 | 9/2004 | Hayes |
| 6,808,795 B2 | 10/2004 | Noda et al. |
| 6,821,373 B1 | 11/2004 | Berlin et al. |
| 6,841,597 B2 | 1/2005 | Bastioli et al. |
| 6,844,077 B2 | 1/2005 | Squier et al. |
| 7,067,596 B2 | 6/2006 | Bastioli et al. |
| 7,070,803 B2 | 7/2006 | Shinhoj et al. |
| 7,087,313 B2 | 8/2006 | Sawai et al. |
| 7,112,356 B2 | 9/2006 | Nomula et al. |
| 7,128,969 B2 | 10/2006 | Busch et al. |
| 7,173,080 B2 | 2/2007 | Yamada et al. |
| 7,175,917 B2 | 2/2007 | Sukigara et al. |
| 7,195,822 B2 | 3/2007 | Hiruma |
| 7,214,414 B2 | 5/2007 | Khemani et al. |
| 7,223,359 B2 | 5/2007 | Torkelson et al. |
| 7,235,287 B2 | 6/2007 | Egawa |
| 7,285,318 B2 | 10/2007 | Kaku et al. |
| 7,316,848 B2 | 1/2008 | Longmoore |
| 7,320,773 B2 | 1/2008 | Egawa |
| 7,351,772 B2 | 4/2008 | Yano et al. |
| 7,351,785 B2 | 4/2008 | Matsumoto et al. |
| 7,354,973 B2 | 4/2008 | Flexman |
| 7,368,160 B2 | 5/2008 | Inglis |
| 7,368,496 B2 | 5/2008 | Kim et al. |
| 7,390,543 B2 | 6/2008 | Itoh et al. |
| 7,390,558 B2 | 6/2008 | Aritake et al. |
| 7,449,510 B2 | 11/2008 | Ueda et al. |
| 7,452,927 B2 | 11/2008 | Hayes |
| 7,491,359 B2 | 2/2009 | Bourgeois |
| 7,501,176 B2 | 3/2009 | Yamasaki et al. |
| 7,521,103 B2 | 4/2009 | Posey |
| 7,566,753 B2 | 7/2009 | Randall et al. |
| 7,589,151 B2 | 9/2009 | Aoki et al. |
| 7,619,025 B2 | 11/2009 | Mohanty et al. |
| 7,678,444 B2 | 3/2010 | Tedford, Jr. et al. |
| 7,713,636 B2 | 5/2010 | Song et al. |
| 7,714,048 B2 | 5/2010 | Goino et al. |
| 7,786,210 B2 | 8/2010 | Uradnisheck et al. |
| 7,799,399 B2 | 9/2010 | Sargeant et al. |
| 7,820,276 B2 | 10/2010 | Sukigara et al. |
| 7,834,092 B2 | 11/2010 | Uradnisheck et al. |
| 7,847,184 B2 | 12/2010 | Hayes et al. |
| 7,854,994 B2 | 12/2010 | Henderson-Rutgers et al. |
| 7,943,218 B2 | 5/2011 | Knoerzer et al. |
| 7,951,438 B2 | 5/2011 | Lee et al. |
| 7,993,745 B2 | 8/2011 | Narita et al. |
| 8,003,731 B2 | 8/2011 | Seeliger et al. |
| 8,043,674 B2 | 10/2011 | Rehkugler et al. |
| 8,053,219 B2 | 11/2011 | Kang et al. |
| 8,062,721 B2 | 11/2011 | Kawahara et al. |
| 8,080,297 B2 | 12/2011 | Kravitz et al. |
| 8,252,421 B2 | 8/2012 | Arai et al. |
| 8,450,420 B2 | 5/2013 | Sakurai |
| 2001/0031348 A1 | 10/2001 | Jud et al. |
| 2002/0006485 A1 | 1/2002 | Bening et al. |
| 2002/0028857 A1 | 3/2002 | Holy |
| 2002/0076554 A1 | 6/2002 | Stopper |
| 2002/0086940 A1 | 7/2002 | Ota et al. |
| 2002/0094444 A1 | 7/2002 | Nakata et al. |
| 2002/0127358 A1 | 9/2002 | Berlin et al. |
| 2003/0039775 A1* | 2/2003 | Kong .................. 428/34.9 |
| 2003/0175545 A1 | 9/2003 | Kastner et al. |
| 2003/0199218 A1 | 10/2003 | Mueller et al. |
| 2004/0053064 A1 | 3/2004 | Masuda et al. |
| 2004/0096677 A1 | 5/2004 | Imai et al. |

(56) References Cited

U.S. PATENT DOCUMENTS

| | | | |
|---|---|---|---|
| 2004/0185282 A1 | 9/2004 | Rosenbaum et al. | |
| 2004/0191541 A1 | 9/2004 | Squier et al. | |
| 2004/0258857 A1 | 12/2004 | Dagan et al. | |
| 2005/0098928 A1 | 5/2005 | Rosenbaum et al. | |
| 2005/0131120 A1 | 6/2005 | Flexman | |
| 2005/0186414 A1 | 8/2005 | Su et al. | |
| 2005/0250931 A1 | 11/2005 | Takagi | |
| 2005/0287358 A1 | 12/2005 | Inglis | |
| 2006/0009611 A1 | 1/2006 | Hayes | |
| 2006/0019111 A1 | 1/2006 | Sawai et al. | |
| 2006/0068200 A1 | 3/2006 | Cleckner et al. | |
| 2006/0116471 A1 | 6/2006 | Aoyama et al. | |
| 2006/0135668 A1 | 6/2006 | Hayes | |
| 2006/0257585 A1 | 11/2006 | Schiller et al. | |
| 2006/0257676 A1 | 11/2006 | Itada et al. | |
| 2006/0269755 A1* | 11/2006 | Song | 428/411.1 |
| 2007/0020448 A1 | 1/2007 | Hubbard et al. | |
| 2007/0032577 A1 | 2/2007 | Kanzawa et al. | |
| 2007/0036923 A1 | 2/2007 | Ishizaki et al. | |
| 2007/0054070 A1 | 3/2007 | Laney et al. | |
| 2007/0087131 A1 | 4/2007 | Hutchinson et al. | |
| 2007/0098966 A1 | 5/2007 | Zhou | |
| 2007/0141372 A1 | 6/2007 | Su et al. | |
| 2007/0179218 A1 | 8/2007 | Brake et al. | |
| 2007/0182041 A1 | 8/2007 | Rizk et al. | |
| 2007/0254160 A1 | 11/2007 | Kravitz et al. | |
| 2007/0259139 A1 | 11/2007 | Furneaux | |
| 2008/0027178 A1 | 1/2008 | Uradnisheck | |
| 2008/0160327 A1 | 7/2008 | Knoerzer et al. | |
| 2008/0188154 A1 | 8/2008 | Leis et al. | |
| 2008/0311813 A1 | 12/2008 | Ting et al. | |
| 2009/0022919 A1 | 1/2009 | Chicarella et al. | |
| 2009/0053489 A1 | 2/2009 | Yamamura et al. | |
| 2009/0098375 A1 | 4/2009 | Voisin et al. | |
| 2009/0098395 A1 | 4/2009 | Lu | |
| 2009/0148713 A1 | 6/2009 | Lee et al. | |
| 2009/0148715 A1 | 6/2009 | Lee | |
| 2009/0169844 A1 | 7/2009 | Yamamura et al. | |
| 2009/0171065 A1 | 7/2009 | Nakamura et al. | |
| 2009/0263600 A1 | 10/2009 | Miyashita et al. | |
| 2009/0263654 A1 | 10/2009 | Arai et al. | |
| 2009/0286090 A1 | 11/2009 | Ting et al. | |
| 2009/0311544 A1 | 12/2009 | Lee et al. | |
| 2009/0312462 A1 | 12/2009 | Oakley et al. | |
| 2010/0009208 A1 | 1/2010 | Lee | |
| 2010/0040904 A1 | 2/2010 | Cloutier et al. | |
| 2010/0092791 A1 | 4/2010 | Busch et al. | |
| 2010/0151167 A1 | 6/2010 | Gohil | |
| 2010/0247886 A1 | 9/2010 | Lee et al. | |
| 2010/0323196 A1 | 12/2010 | Dou et al. | |
| 2010/0330382 A1 | 12/2010 | Dou et al. | |
| 2011/0028622 A1* | 2/2011 | Uradnisheck | 524/211 |
| 2011/0046254 A1 | 2/2011 | Shin et al. | |
| 2011/0052867 A1 | 3/2011 | Yamamura et al. | |
| 2011/0171489 A1 | 7/2011 | Dou et al. | |
| 2011/0244186 A1 | 10/2011 | Dou et al. | |
| 2011/0244257 A1 | 10/2011 | Paulino et al. | |
| 2012/0088108 A1 | 4/2012 | Paolilli et al. | |
| 2012/0141766 A1 | 6/2012 | Paulino et al. | |
| 2013/0143057 A1 | 6/2013 | Paolilli et al. | |
| 2013/0143064 A1 | 6/2013 | Paolilli et al. | |

FOREIGN PATENT DOCUMENTS

| | | |
|---|---|---|
| EP | 1 385 700 | 7/2005 |
| EP | 1 619 021 | 1/2006 |
| EP | 1 385 899 | 2/2007 |
| EP | 1 839 849 | 10/2007 |
| EP | 1 942 001 | 7/2008 |
| EP | 1 955 845 | 8/2008 |
| EP | 2 065 178 | 6/2009 |
| EP | 2 133 382 | 12/2009 |
| JP | 8-176329 | 7/1996 |
| JP | 2002-155207 | 5/2002 |
| JP | 2003-145677 | 5/2003 |
| JP | 2003-170560 | 6/2003 |
| JP | 2003-276144 | 9/2003 |
| JP | 2004-82512 | 3/2004 |
| JP | 2004-315586 | 11/2004 |
| JP | 2004-323592 | 11/2004 |
| JP | 2004-358721 | 12/2004 |
| JP | 2006-176758 | 7/2006 |
| JP | 2006-263892 | 10/2006 |
| JP | 2007-076192 | 3/2007 |
| JP | 2007-99952 | 4/2007 |
| JP | 2007-269995 | 10/2007 |
| JP | 2008-62591 | 3/2008 |
| JP | 2008-62984 | 3/2008 |
| KR | 10-2006-0099887 | 9/2006 |
| KR | 10-2007-0102005 | 10/2007 |
| WO | WO-94/17220 | 8/1994 |
| WO | WO-02/087877 | 11/2002 |
| WO | WO-02/088230 | 11/2002 |
| WO | WO-2004/016417 | 2/2004 |
| WO | WO-2004/060648 | 7/2004 |
| WO | WO-2004/087812 | 10/2004 |
| WO | WO-2004/094143 | 11/2004 |
| WO | WO-2004/101642 | 11/2004 |
| WO | WO-2005/053964 | 6/2005 |
| WO | WO-2005/059031 | 6/2005 |
| WO | WO-2007/046174 | 4/2007 |
| WO | WO-2007/118280 | 10/2007 |
| WO | WO-2008/020726 | 2/2008 |
| WO | WO-2008/035557 | 3/2008 |
| WO | WO-2009/076458 | 6/2009 |
| WO | WO-2009/076541 | 6/2009 |
| WO | WO-2009/084518 | 7/2009 |
| WO | WO-2009/142825 | 11/2009 |
| WO | WO-2009/152427 | 12/2009 |
| WO | WO-2010/019944 | 2/2010 |

OTHER PUBLICATIONS

Defosse, Matt. "Film extrusion: Bioplastic barrier film matches EVOH, PA," located at <http://www.plasticstoday.com/print/31263> visited on Nov. 20, 2009. (1 page).

"Coextruded Film Structures of PLA and EVOH," presented at Tappi Place Conference, Albuquerque, New Mexico, Apr. 18-21, 2010; 31 pages.

Shichen Dou et al., U.S. Appl. No. 13/030,392, filed Feb. 18, 2011; 63 pages.

International Search Report and Written Opinion mailed Feb. 11, 2011, directed to International Patent Application No. PCT/US10/50227; 10 pages.

International Search Report and Written Opinion mailed Mar. 14, 2011, directed to International Patent Application No. PCT/US10/62062; 10 pages.

International Search Report and Written Opinion mailed Jun. 3, 2011, directed to International Patent Application No. PCT/US11/25466; 9 pages.

International Search Report and Written Opinion mailed May 26, 2011, directed to International Patent Application No. PCT/US11/30784; 9 pages.

International Search Report and Written Opinion, mailed Aug. 17, 2011, directed to International Patent Application No. PCT/US11/36453; 11 pages.

Wallach, J. et al., "Methacrylic Group Functionalized Poly(lactic acid) Macromonomers from Chemical Recycling of Poly(lactic acid)." *Polymers from Renewable Resources*, ACS Symposium Series [online]. Jan. 15, 2001. Chapter 18, pp. 281-292: Retrieved from the Internet: URL:http://pubs.acs.org/doi/abs/10.1021/bk-2000-0764.ch018, Abstract only.

Lee, U.S. Office Action mailed Sep. 27, 2011, directed to U.S. Appl. No. 12/333,047; 7 pages.

Biofilm S.A. promotional literature (presented at "Innovation Takes Root" by Nature Works, Las Vegas NV. Sep. 16-18, 2008).

TAPPI Conference Presentation, May 2003, "Adhesive Properties of Ethylene-Acrylic Ester-Maleic Anhydride Terpolymers in Extrusion Coating/Lamination"; (27 pages).

(56) References Cited

OTHER PUBLICATIONS

Product Literature Presentation, May 2005, "Lotader: Ultra Versatile Adhesives for Extrusion Coating and Extrusion Lamination Technologies"; (18 pages).

Jiang, et al., (Nov. 23, 2005). "Study of Biodegradable Polylactide/Poly(butylene adipate-co-terephthalate) Blends," *Biomacromolecules.* 7(1):199-207.

Paolilli et al., U.S. Appl. No. 12/890,349, filed Jun. 28, 2010; 52 pages.

(2007) "Technology Focus Report: Toughened PLA," *NatureWorks* 1-5.

Priddy D. (2010). "Improving PLA mechanical properties by the addition of oil." *Polymer Engineering and Science* 50(3):513-519.

International Search Report and Written Opinion mailed on Feb. 6, 2009, directed to counterpart international Application No. PCT/US2008/86261; 8 pages.

International Search Report and Written Opinion mailed on Feb. 6, 2009, directed to counterpart International Patent Application No. PCT/US2008/86450; 5 pages.

International Search Report mailed on Oct. 1, 2009 directed at international application No. PCT/US2009/054022; 12 pages.

International Search Report and Written Opinion mailed on Aug. 17, 2010, directed to counterpart International Patent Application No. PCT/US10/38848; 11 pages.

International Search Report and Written Opinion mailed on Sep. 1, 2010, directed to counterpart International Patent Application No. PCT/US2010/040185; 10 pages.

Lee et al., U.S. Office Action mailed Jun. 25, 2009, directed to U.S. Appl. No. 12/332,153; 9 pages.

Lee et al., U.S. Office Action mailed on Dec. 23, 2009, directed at U.S. Appl. No. 12/332,153; 10 pages.

Lee et al., U.S. Office Action mailed on Apr. 12, 2010, directed at U.S. Appl. No. 12/332,153; 11 pages.

Lee et al., U.S. Office Action mailed on Sep. 28, 2010, directed at U.S. Appl. No. 12/332,153; 9 pages.

Shichin Dou et al., U.S. Appl. No. 61/218,846, filed Jun. 19, 2009; 13 pages.

Dou et al., U.S. Office Action mailed Aug. 20, 2012, directed to U.S. Appl. No. 12/824,759; 12 pages.

Dou et al., U.S. Office Action mailed Sep. 7, 2012, directed to U.S. Appl. No. 13/077,302; 12 pages.

Lee, U.S. Office Action mailed May 25, 2012, directed to U.S. Appl. No. 12/333,047; 9 pages.

Cloutier et al., U.S. Office Action mailed Jul. 6, 2012, directed to U.S. Appl. No. 12/542,428; 10 pages.

Dou et al., U.S. Office Action mailed Aug. 7, 2012, directed to U.S. Appl. No. 12/814,802; 19 pages.

Paulino et al., U.S. Office Action mailed Dec. 26, 2012, directed to U.S. Appl. No. 13/107,149; 15 pages.

Paolilli et al., U.S. Office Action mailed Jan. 16, 2013, directed to U.S. Appl. No. 12/890,349; 11 pages.

Dou et al., U.S. Office Action mailed Jan. 18, 2013, directed to U.S. Appl. No. 12/814,802; 15 pages.

Dou et al., U.S. Office Action mailed Jan. 22, 2013, directed to U.S. Appl. No. 12/824,759; 9 pages.

Dou et al., U.S. Office Action mailed Feb. 14, 2013, directed to U.S. Appl. No. 13/077,302; 13 pages.

Office Action dated Jul. 7, 2014, directed to MX Application No. MX/a/2011/001623; 7 pages.

Dou et al., U.S. Office Action mailed Aug. 13, 2014, directed to U.S. Appl. No. 13/030,392; 12 pages.

Paolilli et al. U.S. Office Action mailed Oct. 8, 2014, directed to U.S. Appl. No. 12/890,349; 16 pages.

Lee, U.S. Office Action mailed Mar. 27, 2014, directed to U.S. Appl. No. 12/333,047; 14 pages.

Dou et al., U.S. Office Action mailed Mar. 27, 2014, directed to U.S. Appl. No. 12/814,802; 14 pages.

Paolilli et al., U.S. Office Action mailed Apr. 9, 2014, directed to U.S. Appl. No. 12/890,349; 12 pages.

Dou et al., U.S. Office Action mailed Jun. 17, 2014, directed to U.S. Appl. No. 13/077,302; 12 pages.

Extended European Search Report dated Nov. 6, 2012, directed to EP Application No. 08859113.6; 6 pages.

Extended European Search Report dated Nov. 14, 2012, directed to EP Application No. 08860690.0; 6 pages.

Paulino et al., U.S. Office Action mailed Aug. 5, 2013, directed to U.S. Appl. No. 13/107,149; 20 pages.

Cloutier et al., U.S. Office Action mailed Jun. 19, 2013, directed to U.S. Appl. No. 12/542,428; 10 pages.

Cloutier et al., U.S. Office Action mailed Nov. 22, 2013, directed to U.S. Appl. No. 12/542,428; 10 pages.

Extended European Search Report dated Nov. 21, 2012, directed to EP Application No. 09807412.3; 6 pages.

Lee et al., U.S. Office Action mailed Sep. 20, 2012, directed to U.S. Appl. No. 12/731,925; 18 pages.

Lee et al., U.S. Office Action mailed Jun. 4, 2013, directed to U.S. Appl. No. 12/731,925; 18 pages.

International Search Report and Written Opinion mailed May 7, 2010, directed to International Application No. PCT/US10/028685; 8 pages.

Extended European Search Report dated May 3, 2013, directed to EP Application No. 10756851.1; 5 pages.

Canadian Office Action mailed Apr. 16, 2013, directed to CA Application 2,766,816; 2 pages.

Paolilli et al., U.S. Office Action mailed Jul. 17, 2013, directed to U.S. Appl. No. 12/890,349; 12 pages.

Paolilli et al., U.S. Office Action mailed Oct. 10, 2013, directed to U.S. Appl. No. 13/754,215; 10 pages.

Paolilli et al., U.S. Office Action mailed Sep. 3, 2013, directed to U.S. Appl. No. 13/754,476; 8 pages.

Dou et al., U.S. Office Action mailed Apr. 24, 2013, directed to U.S. Appl. No. 13/030,392; 12 pages.

Dou et al., U.S. Office Action mailed Sep. 24, 2013, directed to U.S. Appl. No. 13/030,392; 9 pages.

Markarian, Jennifer. (May-Jun. 2008). "Biopolymers present new market opportunities for additives in packaging," *Plastics, Additives, and Compounding* 10(3): 22-25.

Paulino et al., U.S. Office Action mailed May 22, 2013, directed to U.S. Appl. No. 13/313,567; 9 pages.

Paulino et al., U.S. Office Action mailed Oct. 16, 2013, directed to U.S. Appl. No. 13/313,567; 8 pages.

Paulino et al., U.S. Office Action mailed Feb. 26, 2014, directed to U.S. Appl. No. 13/313,567; 15 pages.

Cloutier et al., U.S. Office Action mailed Jul. 24, 2014, directed to U.S. Appl. No. 12/542,428; 10 pages.

Paulino et al., U.S. Office Action mailed Oct. 23, 2014, directed to U.S. Appl. No. 13/313,567; 12 pages.

Dou et al., U.S. Office Action mailed Nov. 6, 2014, directed to U.S. Appl. No. 13/077,302; 11 pages.

Dou et al., U.S. Office Action mailed Dec. 17, 2014, directed to U.S. Appl. No. 12/814,802; 21 pages.

Paulino et al., U.S. Office Action mailed Jan. 23, 2015, directed to U.S. Appl. No. 13/107,149; 26 pages.

Cloutier et al., U.S. Office Action mailed Feb. 5, 2015, directed to U.S. Appl. No. 12/542,428; 11 pages.

Dou et al., U.S. Office Action mailed Mar. 12, 2015, directed to U.S. Appl. No. 13/030,392; 8 pages.

Dou et al., U.S. Office Action mailed May 22, 2015, directed to U.S. Appl. No. 13/077,302; 12 pages.

Paulino et al., U.S. Office Action mailed May 21, 2015, directed to U.S. Appl. No. 13/313,567; 15 pages.

Cloutier et al., U.S. Office Action mailed Jul. 30, 2015, directed to U.S. Appl. No. 12/542,428; 5 pages.

Supplementary European Search Report mailed Jul. 24, 2015, directed to EP Application No. 10819546.2; 7 pages.

\* cited by examiner

1. Biaxially oriented PLA film

3. Co-extruded first skin layer
2. Co-extruded core layer

} 1. Biaxially oriented PLA film

3. Co-extruded first skin layer
2. Co-extruded core layer
4. Co-extruded second skin layer } 1. Biaxially oriented PLA film

BIAXIALLY ORIENTED POLYLACTIC ACID FILM WITH REDUCED NOISE LEVEL

CROSS-REFERENCE TO RELATED APPLICATION

This application claims the benefit of U.S. Provisional Patent Application Ser. No. 61/319,776, filed Mar. 31, 2010.

FIELD OF INVENTION

This invention relates to a biaxially oriented polylactic acid (BOPLA) film with a novel formulation which exhibits a softer feel and quieter sound, without jeopardizing film making stability. This film can be used for packaging applications.

BACKGROUND OF THE INVENTION

Biaxially oriented polypropylene (BOPP) films are typically used for packaging, decorative, and label applications and often perform multiple functions. In a lamination, they provide printability, transparent or matte appearance, or slip properties. The films sometimes provide a surface suitable for receiving organic or inorganic coatings for gas and moisture barrier properties. The films sometimes provide a heat sealable layer for bag forming and sealing, or a layer that is suitable for receiving an adhesive either by coating or by laminating.

However, in recent years, interest in "greener" packaging has been strongly developing. Packaging materials based on biologically derived polymers are increasing due to concerns with renewable resources, raw materials, and greenhouse gas generation. Bio-based polymers are believed—once fully scaled-up—to help reduce reliance on petroleum, reduce production of greenhouse gases, and can be biodegradable or compostable as well. Bio-based polymers such as polylactic acid (PLA)—which is currently derived from corn starch (but can be derived from other plant sugars) and thus, can be considered to be derived from a renewable resource—is one of the more popular and commercially available materials available for packaging film applications. Such bio-based polymers used for packaging applications can also be degradable and/or compostable in certain situations.

For such a bio-based polymer to be fit-for-use for many snack food packaging applications, it is desirable that the bio-based polymer film match as many of the attributes possible that BOPP is well-known for, such as heat sealability, printability, controlled COF, metallizability, barrier, etc. For example, for high barrier packaging, metallized oriented PLA films should demonstrate good oxygen and moisture barrier properties. For metallized oriented PLA in particular, good oxygen barrier property is generally easily achieved due to the polar nature of PLA, which provides good hydrogen-bonding of the polymer molecules. However, this polar nature tends to be detrimental for achieving high moisture barrier. Without being bound by any theory, the thought is that water molecules—being polar themselves—may more easily migrate through a polar polymer film than a non-polar polymer film.

In recent applications of biaxially oriented polylactic acid (BOPLA) films used in place of BOPP in snack-food packaging applications, it has been noted that the higher stiffness and modulus of BOPLA films versus BOPP films, have resulted in a "noisier" package, particularly for flexible bag packaging for salty snacks such as corn-based chips or potato chips. Many consumers have noted that chip packaging utilizing a lamination of a BOPLA print film and a BOPLA metallized gas barrier film is significantly louder during handling (i.e. opening of the chip bag, reclosing of the chip bag) than traditional packaging using a lamination of a BOPP print film and a BOPP metallized gas barrier film; or even an hybrid package lamination including a BOPP print film and a BOPLA metallized gas barrier film. For some consumers, the increased loudness or noisiness of the BOPLA/BOPLA laminate package is objectionable compared to traditional BOPP/BOPP laminate packages. Of note, however, is that if a laminate package is made using a BOPP film laminated to a BOPLA film, the noise generated could be acceptable to the consumer. However, such "50%" bio-based laminate does not satisfy the above requirements of being "green" because the proportion of sustainable, renewable materials is not as high as desired; furthermore, it does not bio-degrade or compost due to the high percentage of OPP in the laminate structure. Thus, it appears that to reduce noise in an all-BOPLA laminate package structure—and also retain its high renewable material content and compostability—it is necessary not only to "soften" but also to "quiet" the BOPLA film. Quieter BOPLA films for packaging applications that maintain compostability of the package and suitable processability are described.

Modifier and additives have been added to BOPLA films to reduce the modulus and stiffness of the BOPLA films. U.S. Pat. No. 7,128,969 describes a film composed of a base layer of PLA with a minority component of a thermoplastic or polyolefin such as polypropylene or polyethylene, typically less than 1% by weight of the base layer. Such a formulation is particularly suitable for thermoforming or biaxial stretching by means of pneumatic drawing or other mechanical forming. However, this patent does not include formulations that also reduce the noise of the film, and maintain compostability and suitability for processing.

U.S. Pat. No. 5,908,918 describes an impact-modified PLA packaging film using a degradable impact modifier and plasticizer. The impact-modifier is preferably combined with the plasticizer to achieve the desired improvement in impact strength and flexibility. The use of low molecular weight, migratory plasticizers, however, can be detrimental to other useful properties desired in packaging films such as metallizing for high barrier or high-definition printing of the packaging film for graphics and advertising. This patent does not contemplate achieving highly flexible PLA-based packaging films using components that do not contain a plasticizer and which may not affect metallizing or printing characteristics.

Similarly, EP Patent Application 08739216 describes a film formulation to produce softer PLA articles using a vegetable oil-derived plasticizer with the PLA resin. However, such vegetable oil-based materials may be migratory and cause problems with metallizing or printing of such a modified substrate.

The article "Improving PLA Mechanical Properties by the Addition of Oil," Polymer Engineering & Science (2010), vol. 50, issue 3, pp. 513-519, describes using oils to toughen PLA films. Upon addition of specific oils, PLA film modulus decreases and ductility improved. However, such oils are migratory and can cause processing problems as well as poor properties for metallizing and printing.

The article "Technology Focus Report: Toughened PLA," Natureworks® LLC (2007) technical bulletin, describes the use of various types of elastomers—including non-degradable polyolefin elastomers—to improve toughness and impact properties of PLA articles. However, such elastomers are preferably added at amounts of 10-30 wt % to achieve improvements in toughness and such amounts can worsen compostability.

U.S. patent application Ser. No. 12/161,967 describes a film formulation including PLA and polyether-polylactic acid copolymer. The addition of an amount of polyether-polylactic acid copolymer softens the PLA is rather large, about 20-50 wt % of the film.

U.S. Pat. No. 7,214,414, WO 2007046174 and JP 200531998 disclose films including low $T_g$ polymers that allow the films to have some suitable properties for packaging films. However, the films are mainly described as being suitable for blown film processing. These references do not provide sufficient disclosure of films suitable for sequential processing or a simultaneous biaxially oriented PLA filmmaking processing. Furthermore, these references do not describe how to achieve the quietness and sufficient process suitability.

JP4210492 discloses a biaxially oriented PLA film having 15-50 wt % of aliphatic polyester to achieve good die cutting properties etc. U.S. patent application Ser. No. 09/932,523, publication 2003/0039775 A1 describes polylactic acid-based films including a toughening additive of 5-40 wt % of the core. The toughening additives are shown to improve elongation-to-break property of the films but also show a high degree of heat shrinkage and less thermal stability which can be detrimental for many packaging applications.

SUMMARY OF THE INVENTION

We seek to address the above noise issues of PLA films that are used for packaging, while maintaining compostablity and processability of the films. In addition, the disclosed film have high gas and moisture barriers an may be metallized BOPLA films and/or can be high quality printable films.

The inventors have found that by adding a modifying second polymer "A" to a core or base layer of a polylactic acid-based biaxially oriented film wherein the polymer "A" is preferably a biodegradable polymer with a glass transition temperature $T_g$ of 0° C. or less, the noise level of the film is significantly reduced. The noise level of the film can be less than 90 decibels (dB). In comparison, unmodified PLA-based films can exhibit a noise level of 90 dB—and typically higher—noise level. Moreover, the films can exhibit a noise level that is at least 5 dB lower than the non-modified PLA-based films.

The amount of modifying second polymer "A" to be used is preferably between about 10 and 40 wt % of the quiet layer of interest (usually a core or base layer, though a skin layer can be contemplated as well) with the remainder of the composition comprising essentially polylactic acid (either crystalline or amorphous or a blend of both) in an amount of about 90 to 60 wt %. In some embodiments, 10 wt % of the modifying polymer A may be sufficient to dampen the noise level of the film. Utilizing greater than 40 wt % of the modifying polymer A can increase cost as well as cause processing problems during the film-making or converting operations such as coating, printing, metallizing, lamination, packaging, etc. A preferred amount of polymer "A" is about 20 wt %.

The modifying polymer A is preferably a biodegradable polymer, so as not to interfere or significantly retard composting or degradability. The polymer A can be selected from polyhydroxybutyrate-valerate, polycaprolactone, polyhydroxyalkanoate, polybutylene-adipate-co-terephthalate, polybutylene succinate, polybutylene-succinate-adipate, PH(R) A R=C2-C10, which have $T_g$ of 0° C. or less, or blends or copolymers of the types.

In addition, an amount of elastomeric rubber may optionally be added to the core or base layer of PLA and polymer A blend in an amount of about 1 to 10 wt % of the layer. 10 wt % or less of this elastomer is preferred as this amount has been found not to impede or retard compostability or degradability, does not have a large effect on overall cost, and does significantly effect the overall film properties and processability. A preferred type of elastomer is styrene block copolymer (SBC) types, in particular, styrene-ethylene-butylene-styrene block copolymer types (SEBS).

The total thickness of the films is less than or equal to 30 μm after biaxial orientation, preferably between 10 and 25 μm, and more preferably between 15 and 20 μm. The film can be a mono-layer film or a multi-layer coextruded film—the latter is preferably comprised of a thicker core or base layer that provides the bulk strength of the overall film and has thinner skin layers on one or both sides of the core layer. Additional intermediate layers may also be added to such a multi-layer structure, interposed between the core layer and the outer skin layer(s). Such multilayer film designs may be symmetrical or asymmetrical in terms of the number of layers on either side of the core layer. Typically, the coextruded skin layers are in the range of 0.5 to 5.0 μm in thickness after biaxial orientation, and preferably between 1.0 and 3.0 μm.

It has also been found that, after biaxial orientation, the modifying polymer A forms a layered, strata-like morphology within the primarily PLA-based layer in which the polymer A has been blended. Such morphology—without being bound by any theory—is believed to reduce the noise energy of the film—resulting in a quieter film. It is preferable that this modified blend with its unique morphology be used in the core or bulk layer of the multi-layer film; however, it can be contemplated to use such a "quiet" formulation in one or more of the outer skin layers either alone, or in conjunction with the core layer.

The films may also be cavitated using mineral-based or polymeric-based cavitating agents, the preference being mineral-based so as not to adversely affect compostability or degradability properties. Typical amount of active cavitating agent to be employed in the core or base layer is about 0.5 to 15 wt % (whether mineral or polymeric), and preferably about 5-10 wt %. Such cavitation can also help reduce noisiness of the film as well as lower the film's density and improve its cost effectiveness. Cavitation also provides opacity and a white appearance, which can be desirable for certain aesthetic aspects for packaging or other applications.

Surface discharge-treatment of the films can be conducted to improve or increase the surface energy of the desired layer's surface. Discharge-treatment of the layer can help improve printability, print quality, ink adhesion, as well as for coating of the surface for adequate wet-out and adhesion, and for vapor deposition of inorganic coatings such as metals, metal oxides, or silicon oxides. Discharge-treatment can be accomplished by several means well-known in the art, including but not limited to: corona discharge, flame, plasma, atmospheric plasma, or corona discharge in a controlled atmosphere of various gas combinations.

It is desirable to metallize the films for aesthetic purposes as well as functional purposes for light barrier and gas and moisture vapor barrier properties. A preferred embodiment may be to metallize one surface of the film via vacuum deposition of a metal. A particularly preferred metal is aluminum. For aluminum deposition, preferred optical density is about 1.5 to 5.0; more preferable is the range of 2.0-3.0 optical density. For transparent barrier applications, aluminum oxide may be used to provide light transparency as well as gas and moisture barrier properties; it could also be contemplated to use other inorganic transparent materials such as silicon oxides.

To improve the barrier properties of the films, any number of suitable gas and moisture barrier organic coatings, which may be transparent or opaque, may be used. Such coatings may be spread onto one surface of the film by means of methods well-known in the art such as gravure roll coating, meyer rod coating, slot die coating, etc. Suitable barrier coatings can be, but not limited to, polyvinyl alcohols, ethylene vinyl alcohols, polyvinyl amines, polyvinylidene chloride, acrylics, polyhydroxyamino ethers, etc. To enhance wet-out and adhesion of the coatings to the film, it can be contemplated to add tie-resin modifiers or grafted materials (e.g. maleic anhydride-grafted or maleic anhydride-comprising copolymers) to the film layer's surface. One can also metallize the coated film upon the coated surface with inorganic coatings as described previously.

One embodiment of a biaxially oriented polylactic acid film includes a quiet quite layer comprising polylactic acid (PLA) polymer and a biodegradable polymer A, wherein the quiet quite layer complies with the following conditions:

$$60\% \leq wt\%(PLA) \leq 90\%$$

$$T_g(A) \leq 0° C.$$

$$10\% \leq wt\%(A) \leq 40\%$$

in which,

Tg (A) is a glass transition temperature of the biodegradable polymer A, wt % (A) is a weight % of the biodegradable polymer A in the quiet layer, wt % (PLA) is a weight % of polylactic acid in the quiet layer. The heat shrinkage of the film may be 10% or less at 120° C.×15 min in both a machine direction (MD) and a transverse direction (TD), a strength at break of the film may be 7000 psi or more in both the MD and the TD direction, and the film may comply with the following condition:

$$E0-E \geq 5 \text{ dB}$$

in which,

E0 is a noise level of a biaxially oriented polylactic acid film consisting essentially of polylactic acid in dB, E is a noise level of a biaxially oriented polylactic acid film with polymer A (dB).

The biaxially oriented polylactic acid film may further include at least one elastomer E, wherein the following condition holds:

$$1\% \leq wt\%(E) \leq 10\%$$

in which:

wt % (E) is a weight % of the elastomer E in the quiet layer.

The biaxially oriented polylactic acid film may also include at least one mineral cavitation agent, wherein the following condition holds:

$$0.5\% \leq wt\%(M) \leq 15\%$$

in which:

wt % (M) is a weight % of the mineral cavitation agent M in the quiet layer.

The biaxially oriented polylactic acid film may also include at least one mineral cavitation agent, wherein the following condition holds:

$$0.5\% \leq wt\%(M) \leq 15\%$$

in which:

wt % (M) is a weight % of the mineral cavitation agent M in the quite layer.

The biaxially oriented polylactic acid film may further include a first skin layer comprising or consisting essentially of polylactic acid. This first skin layer may be heat sealable.

The first skin layer may be coextruded and include amorphous polylactic acid and a polymer A1, wherein the following conditions hold:

$$Tg(A1) \leq 0° C.$$

$$10\% \leq wt\%(A1) \leq 40\%$$

$$60\% \leq wt\%(PLA1) \leq 90\%$$

in which:

Tg (A1) is the glass transition temperature of the biodegradable polymer A1 in the first skin layer, wt % (A1) is a weight % of the biodegradable polymer A1 in the first skin layer, wt % (PLA1) is a weight % of amorphous polylactic acid in the first skin layer.

The biodegradable polymer A1 may be selected from polyhydroxybutyrate-valerate, polycaprolactone, polybutylene-adipate-co-terephthalate, polybutylene-succinate, polybutylene-succinate-adipate, PH(R)A R=C2-C10 or mixtures thereof.

A second coextruded skin layer may be applied on a side opposite of the first skin layer. The second coextruded skin layer may comprise or consist essentially of polylactic acid. The film may be lap sealable. The second skin layer may have a thickness of 3 µm or less.

The film may be compostable based on ASTM D5883. The total thickness variation in the TD of the film may be less than 10%. The film may be a packaging film, such as a food packaging film. The film may be metallized. For example, the film may be metallized with aluminum to an optical density of 1.5 to 5.0.

The film may be part of a laminate, which may be compostable based on ASTM D5883. The laminate may be part of a food packaging.

All these variations of the films can be embodied while maintaining a quieter, less noisy film than unmodified, conventional PLA-based films; maintaining a high degree of compostability and degradability; a high degree of renewable material content; as well as maintaining suitable mechanical properties and processability.

DETAILED DESCRIPTION OF THE INVENTION

Figure 1:
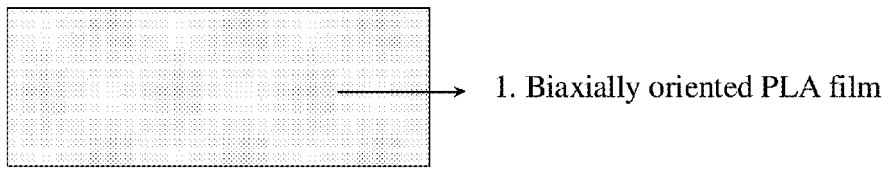
FIG. 1 shows a mono layer structure of the biaxially oriented PLA film according to embodiments of the invention.

Described are biaxially oriented polylactic acid (BOPLA) films with a novel formulation that exhibits a softer feel and quieter sound, without jeopardizing film making stability.

The films can be used, for example, in packaging applications. The films can be metallized, or combined with barrier coatings or layers, for improved gas barrier properties particularly for moisture vapor transmission barrier desired in packaging applications. The films can also be printing films for packaging applications and may be transparent or matte in appearance. The films have characteristics that are beneficial to converting processes, are economical, and maintain biocompostability similar to typical BOPLA films.

The resin forming the films may include polylactic acid as a major component to support enough physical and thermal properties of the films, as well as to keep the cost of the film reasonable (since PLA is currently the most cost-beneficial bio-based polymer). The films may also contain another biodegradable polymer having a $T_g$ (glass transition temperature) of 0° C. or less to dampen the noise energy, which enables the film to be quieter.

To obtain enough rigidity, flatness and durability for mechanical load and thermal treatment during the biaxial orientation process as well as at the downstream processes such as metallizing, printing, lamination or bag-forming, the films preferably contains 60 to 90 wt %, more preferably 70 to 80 wt % of PLA. If the amount is less than 60 wt %, the films with the modifying "softer" polymer "A" may become unfeasible for biaxial orientation processes such as poor thickness profile, may have poor flatness due to less heat resistance, and may possess poor thermal stability, notably higher heat shrinkage. Such films can cause process issues at the downstream processes such as shrinking film, distortion due to such thermal shrinkage, baggy edges or lanes, gauge bands, film breaks, printing pitch mismatches, severe curling etc. If the amount is more than 90 wt %, the films may not be quiet enough to please general consumers. For providing a suitably rigid substrate, it is preferable that the PLA is crystalline, typically the content ratio of D-lactic acid and L-lactic acid as 0:100 to 10:90. Although it may not cause a significant issue even if the PLA essentially contains only L-lactic acid, nevertheless, too much crystalline PLA may cause a deterioration in the film-making process in terms of unstretched lanes or marks or increased film-breaks; thus, a more preferable ratio between D-lactic and L-lactic is 1:99 to 5:95; further preferable ratio is 2:98 to 4:96.

Preferable examples of crystalline PLA resin are, for example, NatureWorks® INGEO™ 4032D (D level=1.4 mol %) or 4042D (D level=4.2 mol %). To adjust the desired D-L ratio, blending of them or blending with any other grade having higher D % such as INGEO™ 4060D (D level=12 mol %) is also applicable. Such a high D % polylactic acid like the 4060D grade is also known as an amorphous PLA. Recycled pellets made out of the BOPLA film may also be used.

The polylactic acid resin including the base layer may be a crystalline polylactic acid of a specific optical isomer content and can be biaxially oriented. As described in U.S. Pat. No. 6,005,068, lactic acid has two optical isomers: L-lactic acid (also known as (S)-lactic acid) and D-lactic acid (also known as (R)-lactic acid). Three forms of lactide can be derived from these lactic acid isomers: L,L-lactide (also known as L-lactide) and which includes two L-lactic acid residuals; D,D-lactide (also known as D-lactide) and which includes two D-lactic acid residuals; and meso-lactide which includes one each of L and D-lactic acid residuals. The degree of crystallinity is determined by relatively long sequences of a particular residual, long sequences either of L or of D-lactic acid. The length of interrupting sequences is important for establishing the degree of crystallinity (or amorphous) and other polymer features such as crystallization rate, melting point, or melt processability. The crystalline polylactic acid resin is preferably one comprised primarily of the L-lactide isomer with minority amounts of either D-lactide or meso-lactide or combinations of D-lactide and meso-lactide. Preferably, the minority amount is D-lactide and the amount of D-lactide is 10 wt % or less of the crystalline PLA polymer. More preferably, the amount of D-lactide is less than about 5 wt %, and even more preferably, less than about 2 wt %. As stated previously, suitable examples of crystalline PLA include Natureworks® INGEO™ 4042D and 4032D. These resins have relative viscosity of about 3.9-4.1, a melting point of about 165-173° C., a crystallization temperature of about 100-120° C., a glass transition temperature of about 55-62° C., a D-lactide content of about 4.25 wt % and 1.40 wt % respectively, density of about 1.25 g/cm³, and a maximum residual lactide in the polylactide polymer of about 0.30 wt % as determined by gas chromatography. Molecular weight $M_w$ is typically about 200,000; $M_n$ typically about 100,000; polydispersity about 2.0. Natureworks® 4032D is the more preferred crystalline PLA resin, being more crystalline than 4042D and more suitable for high heat biaxial orientation conditions. In addition, the 4042D PLA grade contains about 1000 ppm of erucamide and for some applications, particularly for gas barrier metallizing, may not be suitable.

The amorphous PLA is preferably based on an L-lactide isomer with D-lactide content of greater than 10 wt %. As stated previously, a suitable amorphous PLA to use is Natureworks® INGEO™ 4060D grade. This resin has a relative viscosity of about 3.25-3.75, $T_g$ of about 52-58° C., seal initiation temperature of about 80° C., density of about 1.24 g/cm³, a D-lactide content of about 12 wt %, and a maximum residual lactide in the polylactide polymer of about 0.30 wt % as determined by gas chromatography. Molecular weight $M_w$ is about 180,000.

To obtain enough quietness, the film may contain 10 wt % to 40 wt %, preferably 20 wt % to 30 wt % of the base layer of another, second, bio-degradable modifying polymer "A" having $T_g$ of 0° C. or less to dampen the noise energy of the film. If the amount of polymer A is more than 40 wt %, the film may become unfeasible in that it could exhibit detrimental process and quality issues. If the amount is less than 10 wt %, the film may not be quiet enough. This second polymer A is preferably bio-degradable or compostable to maintain the film's overall compostablity as defined in the ASTM methods mentioned below. It is not mandatory that the second polymer be made from a sustainable source, but it is preferable that the percentage of sustainably-sourced material in the total film structure is 80 wt % or more, preferably 90 wt % or more.

Examples of such a second polymer A may include, but are not limited to, polyhydroxybutyrate-valerate (PHBV), polycaprolactone (PCL), polybutylene-adipate-co-terephthalate (PBAT), polybutylene-succinate (PBS), polybutylene-succinate-adipate (PBSA), PH(R)A where R=C2-C10; or mixtures or copolymers of the above. Preferable examples for such polymers are summarized in the Table 1. It is preferable to select one or multiple (mixing) of two or more of them based on the rheology compatibility with PLA at the extrusion temperature to reduce the risk of process issue such as flow mark etc. Based on our study, the combination of polybutylene-adipate-co-terephthalate/polyhydroxybutyrate-valerate or polybutylene-adipate-co-terephthalate/polycaprolactone could be the best mode in terms of the balance of quietness and processability.

To obtain more quietness, the film may also optionally contain an elastomer such as a rubber at about 1 to 10 wt % of the base PLA layer, and preferably about 5 wt %. The use of a rubbery material in the PLA base layer structure may help further absorb or dampen the noise energy efficiently. However, more than about 10 wt % of such non-biodegradable/non-compostable material could reduce the compostability property of the film. Compostability/degradation studies of PLA basefilms made with about 5 wt %-containing non-degradable elastomer does not appear to appreciably affect the degradation or composting speed of the film compared to control PLA films which do not contain the elastomer. Less than about 1 wt % may not be effective for the noise reduction based on our studies. Examples of rubbery materials include, but are not limited to, styrenic block copolymer (SBC) such as styrene-ethylene-butylene-styrene (SEBS) or styrene-ethylene-propylene-styrene (SEPS). For the styrenic block copolymer rubbers, their rubber segment is about 40 to 87% of the polymer. The higher the rubber segment, the softer and more rubbery the polymer is. Preferably, they are modified by grafting with maleic anhydride (MAH) for improving adhesion or compatibility with the host PLA polymer, which is polar. Other natural or synthetic rubbers such as styrene-butadiene rubber (SBR), styrene-butylene-styrene rubber (SBS), chloroprene rubber, etc., can also effectively reduce the noise due to their soft dampening property. Other elastomers can also be contemplated, such as ethylene-propylene-diene-monomer rubbers (EPDM) which have a typical ethylene content of about 45-75 wt % and a $T_g$ of about $-54°$ C. MAH-grafted or MAH-containing materials or tie-resins can also be used with these rubbers to aid in compatibility with PLA. A mixture or copolymer of these rubbery polymers may also be effective for dampening the noise. The preferable styrenic block copolymer (SBC) may be selected in terms of the amounts of rubber segment and the MAH grafting. Exemplary SBC in this study is KRATON Performance Polymers grade FG1924GT, which is a styrene-ethylene-butylene-styrene (SEBS) tri-block rubber. Its polymer contains 87 wt % rubber segments (ethylene-butylene rubber) and is MAH grafted at 0.7 to 1.3 wt %. It has excellent compatibility with PLA.

Figure 4:
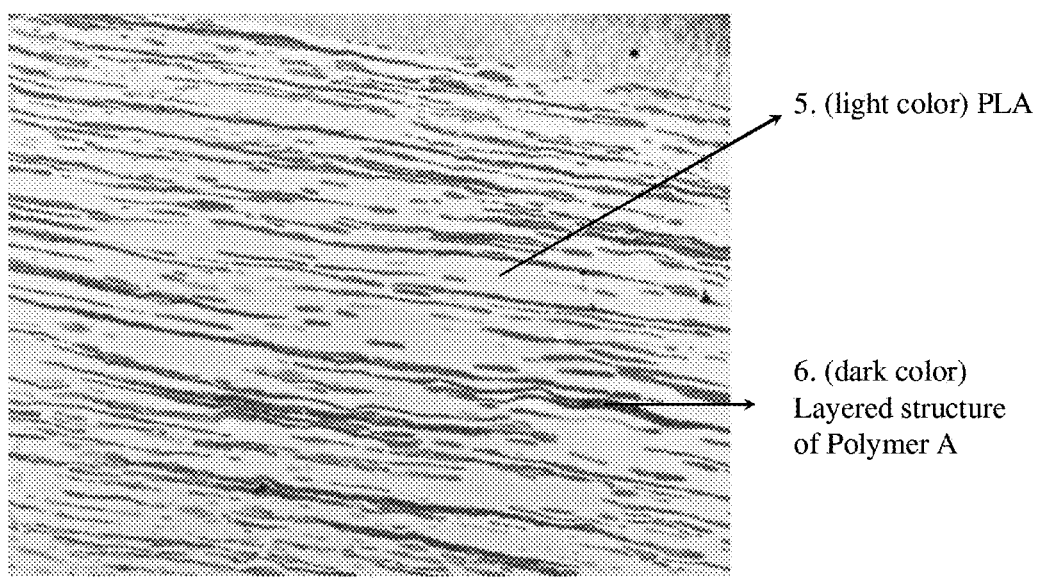
FIG. 4 shows the layered structure (distribution) of the second modifying biodegradable Polymer "A" in the core layer of Example 13 according to embodiments of the invention.
Figure 5:
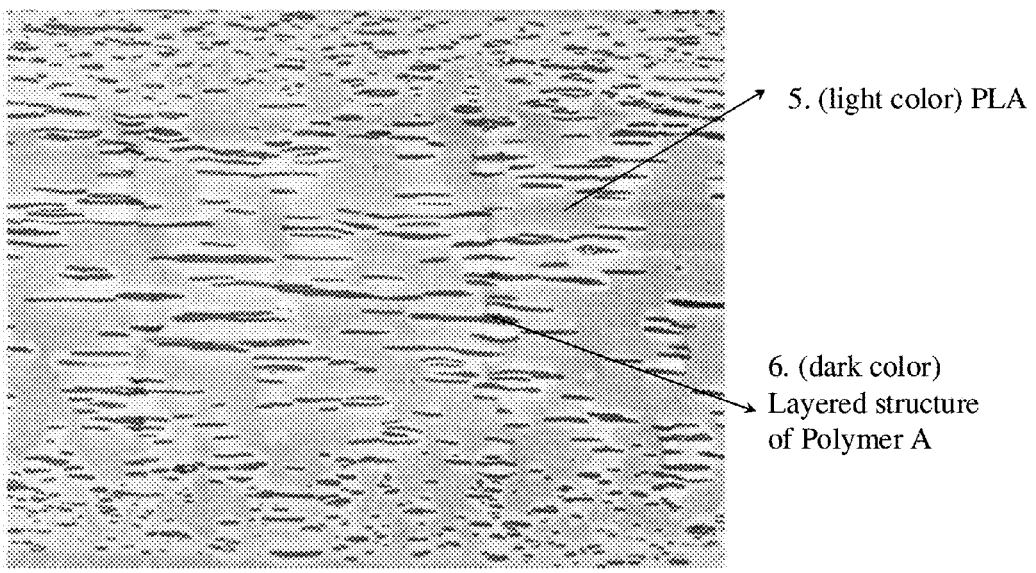
FIG. 5 shows the layered structure (distribution) of the second modifying biodegradable Polymer "A" in the core layer of Example 9 according to embodiments of the invention.

As a preferred embodiment, the inventors believe, without being bound by any theory, that it may be preferred that the modifying second biodegradable polymer A exists as a discontinuous phase and layered structure in the PLA matrix (See FIGS. 4 and 5). It is believed that a certain larger size of the "chunks" of the second biodegradable polymer A may contribute more effectively noise dampening, rather than smaller size "chunks" or a totally miscible mixture of PLA and the second biodegradable polymer A. This distributed, layered, strata-like morphology—or lamellar-like morphology—of the second polymer A type in the PLA matrix is believed to be a key component to reducing and dampening noisiness of the film as a kind of shock absorber or insulator. Indeed, a desired property of the polymer A is the low $T_g$ property enabling it to remain in the rubbery state at room temperature and much more flexible than the glassy PLA matrix, which has relatively high $T_g$ as noted above. It is also noted that if the optional elastomer or rubber is used in conjunction with low $T_g$ polymer A, this rubber also has a very low $T_g$ as well and contributes to the dampening effect of the noisy, glassy PLA. This optional rubber component is also noted to lie in a lamellar-like layered morphology like the second polymer A component and often in the same layers as polymer A. It is contemplated that this layered strata-like "lamellar" morphology can help improve gas and moisture barrier properties of the film by providing a "tortuous path" that impedes the diffusion of gas or water molecules through the film. Indeed, it could be contemplated that such a "tortuous path"-like layer formed by the addition of modifying polymer "A" type or blends to PLA could be used as an effective metal receiving layer for metallized PLA film versions for improved gas and moisture barrier enhancements.

Such a modified, relatively thinner, metal receiving layer on an essentially PLA-based core or base layer could be a cost-effective and economical method to improve gas and moisture barrier properties of metallized PLA films.

As another embodiment, the film may contain mineral particles as cavitating agents. The cavitating agents create voids when the film is stretched or oriented. Such voids around the cavitation agents may also further reduce the energy of noise by the reduced net volume and mass of the film. Examples of mineral cavitating agents may be selected from mica, talc, calcium carbonate ($CaCO_3$), silica ($SiO_2$), titanium oxide ($TiO_2$), barium sulfate ($BaSO_4$), and mixtures thereof. Based on our study, preferred minerals for the cavitating agents are talc or $CaCO_3$ in terms of compatibility with PLA and efficiency of the cavitation. Preferred size of the cavitating agents may be 1 to 5 µm, and more preferably, 2 to 4 µm. If the size is smaller than 1 µm, the efficiency of cavitation may not be enough to reduce the noise. If the size is greater than 5 µm, it may cause some process issue such as filter clogging, process pollution or contamination because the particle may be easy to come off from the film. Large particles could also cause very large voids to form which could result in a mechanically weaker film or increased loss of productivity due to film tears and breaks during orientation or other downstream processing. The preferred content of the cavitation agents may be 1 to 15 wt % of the base PLA layer, more preferably, 3 to 10 wt %. If the content is lower than 1 wt %, the efficiency of cavitation may not be enough to reduce the noise. If the content is greater than 15 wt %, it could make the film too brittle or weak to handle. Another benefit of cavitation of the film is that it also helps reduce the overall density of the PLA-based film, thus improving the economics of the film. However, it should be noted that cavitation opacifies the film, thus rendering it unsuitable for clear or transparent film packaging applications. In terms of compostability or degradability, the use of mineral cavitating agents are generally harmless and do not retard the speed of the PLA-based film's degradation.

It can also be contemplated to utilize polymeric cavitating agents to create suitable voids within the PLA base layer. As with mineral cavitators, the voids formed by polymeric cavitators can help reduce the noise energy as well as the economic cost of the film. Indeed, density of the PLA base layer could be reduced further not only via void formation, but also since the polymeric cavitating agent will have an intrinsically lower density than the mineral cavitating agents. Suitable polymeric agents could be cyclic olefin copolymers (e.g. as described in EP 1 385 899 B1) or crystalline polystyrene. Both of these polymers, however, should be noted as being petroleum-based and non-degradable. One drawback with using such petroleum-based non-degradable polymeric cavitating agents is that it could reduce the compostability or renewable content of the PLA-based film. However, composting/degradation studies have shown that such polymeric cavitating agents used in loadings of less than about 10 wt %—and preferably about 5 wt %—of the base layer does not appreciably delay or retard composting or degradation speed compared to conventional PLA-based control films which do not contain the polymeric cavitating agent. It could be contemplated to address this issue by using a suitable non-petroleum-based version of cyclic olefin copolymer or polystyrene (i.e. produced from plant-based or renewably-sourced monomers) to increase renewable content or by using non-petroleum based degradable or compostable polymeric cavitating agent such that the cavitated film is completely compostable.

The film may further contain any other components such as anti-blocking agents, antioxidants, flame retardant agents, thermal stabilizers, light stabilizers, hydrophobic agents, release agents, coupling agents, chain extenders, end group capping agents, oxygen absorbers, moisture absorbers, anti-coloring agents, UV absorbers, anti-static agents, nucleating agents, lubricants, adhesive improvers, pigments, etc. As far as the film would show enough bio-degradation or compostability as desired in this invention, there is no limitation of the content, but typical content may be 0 to 5 wt % to the total polymeric component.

Total thickness of the film may be 5 to 250 μm. If the thickness is less than 5 μm, the film may not be robust enough for the film-making process and converting process. If the thickness is greater than 250 μm, the film may be too stiff to handle. Preferably, for most packaging applications, the thickness may be 8 to 50 μm, more preferably 10 μm to 30 μm. Especially in terms of balanced performance between noise and processing/handling, the most preferable thickness may be 15 to 25 μm. In terms of noisiness, if the film is thicker, the noise energy gets larger. If the film is thinner, the noise could have a higher frequency, which may be more annoying to the human ear.

Figure 2:
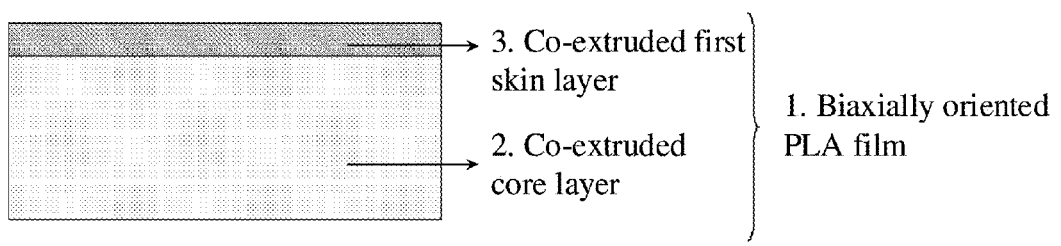
FIG. 2 shows a biaxially oriented PLA film having a first co-extruded skin layer according to embodiments of the invention.
Figure 3:
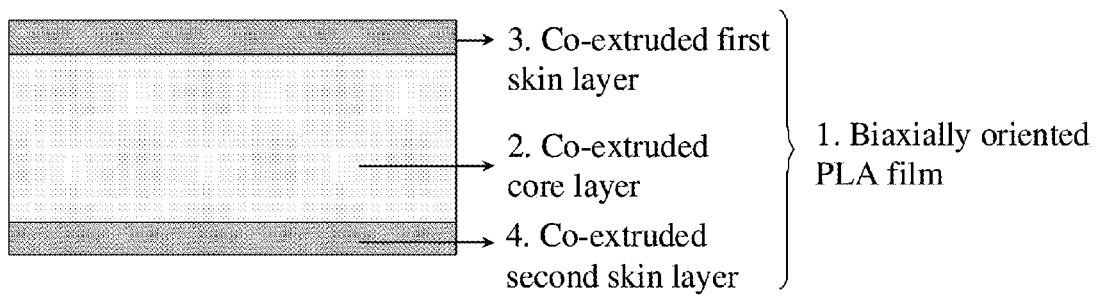
FIG. 3 shows a biaxially oriented PLA film having a first and a second co-extruded skin layer according to embodiments of the invention.

The biaxially oriented PLA film can be a mono-layer or base layer as shown in FIG. 1; or a coextruded multilayer structure such as a 2-layer film of A (skin layer)/B (core or base layer) as shown in FIG. 2 wherein the skin layer A is different than the core or base layer B; a 3-layer film of A (skin)/B (core)/A (skin) wherein the two outer coextruded skin layers are the same and the core layer is different; or A (skin)/B (core)/C (skin) as shown in FIG. 3 wherein all three coextruded layers are of different compositions or formulations. It can be contemplated to have further coextruded layers as well, such as other interlayers between the core and outermost skin layers on either or both sides of the core layer. It may be preferred to have the multilayer structure in terms of multi-functionalized performance of the film. In the case of the multilayer structure, at least the core layer B contains the second biodegradable polymer A, optional elastomer, and optional cavitation agents mentioned above. It can be contemplated to incorporate the second polymer A and optional components in one or more of the coextruded skin layers in addition to the base or core layer B.

In one of the embodiments of the multilayer structure, the skin layer may essentially consist of PLA. An advantage of using essentially PLA resin for the skin layers A and/or C may be, for example, laminating/sandwiching the lower $T_g$ core layer B by the PLA skin layer(s) of which $T_g$ is relatively higher. Such a structure may help prevent some process issues such as sticking to the heated machine direction processing rolls; provide better surface properties such as lower friction for the better handling; provide better metal receiving layer; and/or make the film heat sealable if an amorphous PLA is used. If it is desired that one of the skin layer needs to be heat sealable, the skin layer may preferably be 1 to 3 μm in thickness (after biaxial orientation), and preferably 2 μm thick. The preferred value for acceptable heat seal strength is minimum 200 g/25 mm and preferably 400 g/25 mm or greater at 250° F. (121° C.) seal temperature. For the more preferable use of bag-forming process such as lower SIT (seal initiation temperature) and higher hot tack strength, the thickness of the layer B can be 2.5 μm or more. Initiation temperatures of 230° F. (110° C.) or less are preferred. Preferable hot tack strength is 140 g/25 mm minimum at 250° F. (121° C.) seal temperature.

In another embodiment of the multilayer structure, the skin layer could contain other biodegradable polymers, including the second polymer A of 0° C. $T_g$ or less, and amorphous PLA, and blends thereof. It is advantageous of this type of skin layer formulation that it can improve further the total film quietness and allow the film to be heat sealable because of the content of such noise dampening materials. If it is desired that the skin layer needs to be heat sealable, the skin layer may preferably be 2 μm or thicker.

In another embodiment of the multilayer film structure, the film has two skins surrounding the core layer B, wherein the first skin A contains a blend of bio-degradable polymer A and amorphous PLA and the second skin C essentially consists of PLA resin. The advantage of this structure may be the consolidation of the above mentioned preferred performance for noise reduction. Furthermore, if it is desired that the film needs to be lap sealable in a packaging application, the first skin layer A could be 1 μm or thicker, and the second skin layer may essentially consist of amorphous PLA and the thickness may be 1 μm or thicker.

Preferably, the above mentioned skin layer C which essentially consists of PLA may have the thickness of 3 μm or less. If the thickness is thicker than 3 μm, the total film may become louder.

The biaxially oriented modified PLA film shows a 5 dB or higher noise reduction relative to typical unmodified biaxially oriented PLA films of the same thickness. This noise reduction provides a fully compostable package that is more acceptable to consumers. The frequency distribution of the noise of the film may preferably show an overall reduction of 500 Hz or higher, which is also acceptable to many customers since the lower frequencies are less uncomfortable or annoying to the human ear. (Actual method for sound testing will be explained in the "Test Methods" section below.)

For feasible processability in film-making and particularly downstream processes such as coating, metallizing, printing, laminating, bag-making and sealing, the film has a heat shrinkage of 10% or less, preferably 5% or less in both of MD (machine direction) and TD (transverse direction) at 120° C. for 15 minutes. If the shrinkage is higher than 10%, the film could cause issues (wrinkling, heat lane, baggy film, distortion of flatness, curling etc.) due to the heat from processes such as heated roll, hot air drying ovens etc. in some of these downstream converting processes. Strength at break is also an important property for the processing. The film has the strength at break of 7000 psi (48,263.3 kPa) or more in both of MD (machine direction) and TD (transverse direction), preferably 10,000 psi (68,947.6 kPa) or more. If the strength is less than 7000 psi (48,263.3 kPa), it may cause film break at the process of converting.

As a preferred embodiment, at least one surface of the film may be discharge-treated to enhance the surface wetting tension. Examples of treatment are, but not limited to, corona discharge treatment in air, corona discharge treatment in a controlled atmosphere such as carbon dioxide and/or nitrogen blends (to the exclusion of oxygen gas), flame treatment, plasma treatment, etc. or a combination of the methods. It is preferable that the wetting tension should be 38 mN/m or higher, more preferably, 40 mN/m or higher, depending on the skin layer formulation for good print ink adhesion (or good printability) or for metallizing or coating. Excessive treatment, however, may degrade the polymer and adversely affect the ink adhesion or metal or coating adhesion.

As a preferred embodiment, the film may have proper friction to prevent process or film handling issues related to the film's surface being slippery enough to be wound, conveyed, and processed. The preferred coefficient of friction (COF) may be less than 0.6, more preferably less than 0.5, and most preferably less than 0.4. To achieve such COF, the film could contain anti-blocking and/or slip agents. As far as keeping the scope and feasible properties of the films, suitable inorganic antiblock particles in each skin layer include but are not limited to, for example, zeolite, calcium carbonate, magnesium carbonate, alumina, silica, aluminum silicate, barium hydroxide, kaolin, kaolinite, talc, clay, diatomite, montmorillonite, titanium oxide, high and ultra-high molecular weight silicone gels, and crosslinked silicone polymers (such as polymethoxysilane compounds), and the mixture of them. In addition, organic particles may be added as far as the film may show enough bio-compostability as desired. Suitable organic particles include but are not limited to, for example, polymeric particles such as polymethylmethacrylate compounds, polystyrene compounds, acrylic compounds, polyurethane compounds, polyester compounds, fluorine compound crosslinked particles, and the mixture of them. Particle size in the film may preferably be 0.1 to 5 µm average diameter, more preferably 0.5 to 4 µm, and even more preferably 2 to 3 µm. The content of the particle may be preferably 0.01 to 1 wt % of the skin layer, more preferably 0.01 to 0.5 wt %. A particularly favorable antiblock is spherical sodium calcium aluminum silicate of about 2 and 3 µm nominal diameters such as Mizusawa Silton® JC-20 and JC-30 grades, respectively.

Migratory slip agents may also be used such as fatty amides or silicone oils. Fatty amides such as stearamide, erucamide, behenamide and others can be contemplated. Low molecular weight silicone oils of about 500 cp or less can be used as well. However, especially if the film is metallized or coated, the use of such migratory additives is not favored due to the fact that they will bloom to the surface and could impede metallization or coating wet-out, adherence, and desirable properties such as gas barrier. Some migratory additives like silicone oils can affect the print quality of the inks.

The process to make the film is preferably a biaxial orientation process, either sequential or simultaneous, although the sequential biaxial orientation process is more common. As a general description of the process, raw material pellets of polymers and/or additives mentioned above are dried and then melt-extruded. In the case of the multilayer coextruded film, each layer is separately melt-extruded and laminated through a feed block. The polymer may be extruded using a single screw extruder or vent-type twin-screw extruder to control the output and thereby controlling the variation of the thickness of the film. The resulting melt curtain is pinned via static pinner or air-knife onto a casting drum and quenched, then oriented into the machine direction (MD) and sequentially oriented into the transverse direction (TD). In the same oven for the TD orientation, after the orientation, the film may also be heat-set or annealed to reduce thermal shrinkage of the film and form as thermally dimensionally stable a film as possible. As an additional process, coating layer(s) may be applied by an "in-line" coating method between the MD and TD orientation steps wherein a gravure coater, for example, can be placed to coat the MD-stretched film, which is then conveyed into the TD oven for drying and subsequent TD orientation. The coating may include adhesion promotion coating, anti-static coating, polymeric barrier coating such as ethylene-vinyl alcohol (EVOH), polyvinyl alcohol (PVOH), polyvinyl amine, and their mixture or co-polymers.

Based on our study, the formulation described above can allow the making of biaxially oriented film with nearly the same film-making conditions of conventional biaxially oriented PLA films without significant modification of process or equipment. Not only that, the resulting film qualities such as flatness, gauge band, consistent thickness profile is similar to typical PLA film. In order to run stably in the following downstream converting processes, it may be preferable that the thickness profile variation of the film is 10% or less, more preferably 7% or less.

As one of the examples of downstream converting is the process to apply a coating material onto one surface of the film. The preferred function achieved by such a coating may be: adhesion promotion coating, anti-static coating, or a polymeric gas barrier coating such as ethylene-vinyl alcohol (EVOH), poly vinyl alcohol (PVOH), poly vinyl amine, or their mixtures or co-polymers. U.S. patent application Ser. No. 12/891,394 (PCT publication US2010/50227) describes useful coating formulations for improving gas barrier and particularly moisture barrier; this application is wholly incorporated by reference. Such coating materials can be applied in a dispersion or solution in water or another solvent, using an application method such as gravure coating, meyer rod coating, slot die, knife over roll, or any variation of roll coating. The applied dispersion or solution may then be dried with hot air typically 60° C. to 120° C. The film is exposed to the heat from the hot air. Tension is also applied to the film for conveyance and winding. The film preferably needs to survive against such condition without distortion or shrinkage.

As another example of downstream converting, the film may be placed inside a vacuum chamber metallizer for vapor deposition metallization using aluminum or other metals. During the metal deposition, the film is exposed to the condensation heat of the vaporized metal deposition. Tension is also applied to the film for conveyance and winding. The film preferably needs to survive against such condition without distortion or shrinkage. Typical metals used for high speed deposition can be: aluminum, copper, gold, zinc, titanium, chromium, vanadium, manganese, iron, cobalt, nickel, or palladium, or alloys or blends thereof. Preferably, aluminum is used for cost effectiveness. Typical optical densities usually range from 1.5 to 5.0, preferably 2.0-3.0. Metallization is a low-cost and convenient method to provide improved gas and moisture barrier properties to the film.

In accordance with U.S. patent application Ser. No. 12/542,428 (Publication no. US-2010-0040904-A1) which is wholly incorporated by reference, an optional pre-treatment or "priming" of the substrate surface prior to metallizing by aluminum may be preferably conducted. Such a primer layer has been found to improve beneficially gas barrier properties and metal adhesion of the vapor-deposited metal to the metal receiving layer substrate. This primer layer is comprised primarily of a metal such as copper, titanium, palladium, aluminum, chromium, iron, nickel, zinc, silver, indium, tin and their oxides, the preferable metal being copper or titanium, and most preferably, copper. Blends or alloys of the above metals can also be contemplated. The film roll is placed within a vacuum metallization chamber in which the two types of metallization occur sequentially. The first deposition step deposits the primer layer of metal upon the desired side of the PLA substrate; the second deposition step deposits a second, thicker metal layer upon the first primer metal layer. The primer layer is thinner than the second metal layer, and may not be a contiguous layer upon the PLA substrate in that the priming metal may not completely cover the surface of the PLA substrate. The second metal layer, however, is a contiguous layer and completely covers the primer layer. This second metal layer provides gas and moisture barrier properties.

As described in the specification of EP application publication 02065178/EP-A1, the metal primer layer is formed by a method wherein a cathode metal functioning as a discharging electrode is sputtered onto one side of the PLA resin-containing film layer under a glow discharge inside a vacuum chamber such as used commonly in vapor deposition of metals, and in which the PLA resin-containing layer surface is also activated or discharge-treated at the same time. The film is treated in this manner typically in the low vacuum pressure section of the metallizing chamber where the unwinding film roll is located and the film is passed through this glow discharge treated prior to entering the high vacuum section of the metallizer where the vapor-deposition evaporation boats are located. The glow discharge treater uses a high voltage between the anode and cathode to produce free electrons. A gas is introduced into the treater and the free electrons combine with the gas to produce ions. Magnetic fields guide and accelerate the gas ions onto the metal cathode target, which then emit metal ions. These metal ions are then deposited upon the first PLA resin-containing layer, creating a primer layer which may be a mono-layer of the metal atoms and which may be an incompletely contiguous or enclosed layer.

The pressure range within the vacuum chamber in which the glow discharge takes place is in the range of $10^{-1}$ to $10^{-4}$ torr, power supply to frequency is DC to about 50 MHz, power supply voltage is from about 50 v to 10 kV, and discharge electric current density is from about 1 to 400 mA-min/m$^2$. The power setting for the glow discharge is preferably 300 to 500 v, and more preferably, 380 to 480 v.

Suitable gases for the discharge gas in the discharge atmosphere are those chosen from oxygen, nitrogen, argon, carbon dioxide, water vapor, and blends thereof. Preferably, the chosen gas is oxygen or nitrogen, and more preferably, nitrogen. Without being bound by any theory, the formed metal primer layer thus deposited enhances the nucleation, formation and adherence of a subsequent vapor-deposited metal or inorganic layer upon the primer layer. Suitable gas flow rates are in the range of 0.5-5.0 l/min, preferably 1.0-2.0 l/min.

As a metal for forming the sputtered metal primer layer (i.e. the target cathode metal), suitable metals are chosen from aluminum, chromium, iron, nickel, copper, zinc, gold, silver, indium, tin, titanium, palladium, platinum, and their oxides. Alloys or blends of the suitable metals may also be contemplated. Preferably, copper or titanium is used as the cathode for sputtering. The deposited metal primer layer can contain a product of discharge gas such as metal nitride.

The amount of sputter-deposited metal primer layer is in the range of 5 to 2000 ng/cm$^2$, preferably 100-1000 ng/cm$^2$, and more preferably, about 500-1000 ng/cm$^2$. This can be determined by preparing a known amount of sputter-treated film with the primer metal layer and placing the film in a 1-mol concentration of nitric acid to dissolve the metal and analyzing for the metal content using atomic absorption spectroscopy or inductively coupled plasma spectroscopy (ICP-OES). The amount of sputter-deposited metal primer layer on the first PLA resin-containing layer can also be analyzed using XPS/ESCA in which the amount of metal content on the surface is from about 0.1-2.0 atomic %, and preferably about 0.3-0.6 atomic %.

As another example of downstream converting, one surface of the film could be printed by suitable food packaging inks commonly used in the industry. Typically, one surface of the PLA-based film is discharge-treated and/or formulated to have a relatively high surface energy suitable for printing. Typical wetting tensions are in the range of 36-50 mN/m (dyne-cm/cm$^2$), and preferably 38-42 mN/m. Discharge-treatment of the desired print surface can be achieved by any processes well known in the art such as, but not limited to, corona discharge treatment in air, flame treatment, atmospheric plasma treatment, or corona-discharge treatment in a controlled atmosphere of nitrogen and carbon dioxide to the exclusion of oxygen. Graphic text and images can be printed onto the treated PLA-based substrate with solvent- or water-based inks, or solventless inks that can be electron or UV light-cured. Such graphics are applied in a multi-station printing line using flexo-graphic printing plates or gravure cylinders engraved with the desired graphics. Various stations can apply components of the individual colors and overlay these primary colors to produce a whole spectrum of desired colors and tints (i.e. process printing). If using solvent or water-based inks, dryers are often incorporated between the individual color printing stations to dry the applied ink prior to the next ink color being applied. Finally, the finished printed web is wound into roll form for further processing such as laminating.

As yet another example of downstream converting, the film itself or the coated, metallized or printed film may be laminated with another one (either the same film type or a different film type can be contemplated) by using an adhesive system or extruduate (extruded tie layer) such as a solvent-borne or water-borne or solventless adhesive (e.g. polyurethane or acrylic adhesive with or without cross linking agent) or by using a melt extrusion adhesive (e.g. low density polyethylene). The lamination adhesive is not limited to these adhesives; other adhesive systems may also be used (e.g. pressure-sensitive adhesives, hot melts) and may be biodegradable adhesives as well. These lamination structures may also show preferred quietness and other properties such as sufficient bonding strength, flatness etc., as desired. During the adhesive deposition, the film may be exposed to the heat of hot air to dry the solvent, to the heat of a heated roll to laminate, or to the heat of the extrudate adhesive. Tension is also applied to the film for conveyance and winding. The film preferably needs to survive against such thermal conditions to resist distortion or thermal shrinkage.

EXAMPLES

This invention will be better understood with reference to the following examples, which are intended to illustrate specific embodiments within the overall scope of the invention. Depending on the actual formulations used for the respective layers, optimization of the processing temperatures described below were done to improve various aspects of the film such as film flatness profile, operability, reduced sticking marks, haze, etc. which should be familiar to those skilled in the art.
Test Methods:

The various properties and qualities in the Examples were measured by the following methods:

Glass transition temperature ($T_g$): The glass transition temperature ($T_g$) and melting temperature ($T_m$) of a resin were measured by using a TA Instruments QA-100 differential scanning calorimeter at a heating rate of 10° C./min. substantially in accordance with ASTM D3418. The scanning cycles consist of heating from room temperature to 230° C. at 10° C./min rate and cooling from 230° C. to −70° C. and then re-heating to 200° C. at 10° C./min again. The results of the second heating run were used.

Heat Shrinkage: Heat Shrinkage of the films was measured substantially in accordance with ASTM D1204 except that the measurement condition was: temperature 120° C., processing time 15 min.

Tensile properties: Strength at break, modulus, and elongation of the films were measured using an INSTRON tensile tester model 4201 substantially in accordance with ASTM D882-10. Crosshead speed is about 20 mm/min.

Noise level: Noise level of the biaxially oriented PLA film was measured by placing a single sheet of film 8½"×11" size (ca. 21.5 cm×28 cm) on a GELBO Flex Tester Model 5000ES from United States Testing Company, Inc., set at 15 cycles per minute. A Digital Reference® DR-150 Cardioid Dynamic Microphone was positioned at a radial distance of 10 cm (ca. 4 inches) from the film sample, and the microphone was connected to a Dell laptop computer, SIGMATEL C-MAJOR sound card, with microphone boost and SPDIF enabled. The sound capture/digitalization was done at 44.1 KHz sampling rate, 16-bit signed encoding, and analyzed using Raven Lite® 1.0 or Raven Pro® 1.6 sound recording/analysis software from the Cornell Lab of Ornithology Bio-Acoustics Research Program. For testing film samples, such as the modified biaxially oriented PLA film and an unmodified biaxially oriented PLA film (reference PLA control sample), 10 cycles of 4 seconds each were recorded, and one of these 4 seconds cycles was selected for analysis and comparison with the other film samples and Examples. Each selected cycle sound segment was then filtered from 0 to 400 Hz to eliminate the low frequency background noise. A frequency vs. time grid was then defined by the 4 second time interval and the frequency limits of 0 Hz and the highest frequency that shows a 30 dB power level on the KHz vs. time chart from each film sample. The frequency vs. time grids for the samples were then copied and pasted side by side on a single file and then analyzed. The sound analysis data from Raven Pro® measurement table was then exported to a Microsoft Excel® spreadsheet and the Energy Ratio was calculated for each sample, where Energy Ratio=10 power [(E−E0)/10], E0 is the dB noise level of a biaxially oriented polylactic acid film essentially consisting of polylactic acid (reference PLA control sample compared at the same thickness, which Energy Ratio is normalized to equal 1 by definition), and E is the decibel (dB) noise level of a "quiet"-modified biaxially oriented polylactic acid film (other PLA sample). Energy Ratio of both samples were sorted from high to low and normalized to the reference PLA control and plotted for comparison. The dB levels over the whole frequency grid previously defined were also compared. A comparison of the Center Frequency of each sample was then performed from Raven Pro® measurement table, where Center Frequency is defined by the frequency at which the noise energy for all the frequencies below the Center Frequency is equal to the noise energy for all the frequencies above the Center Frequency. Preferable noise level was less than 90 dB and/or preferably 5.0 dB lower than the control PLA film. It should also be noted that sound measurement in decibels is on a logarithmic scale. Further, the term "noise level", as used herein refers to the noise level obtained according to the method of this paragraph.

Observation of polymer matrix structure in the films: The structure of polymer matrix in the film was observed by transmission electron microscopy Hitachi H7100A model, with electron beam at 100 kV of accelerating voltage, after first microtoming the film in the TD direction to obtain a cross-section and then dyeing the film sample with $RuO_4$.

Thickness: Total thickness of the films was measured using a micro gauge meter and the thickness of each co-extruded layer was determined based upon a ratio of extruder output. Thickness of the respective film layers was also measured by Transmission Electron Microscope (HITACHI H7100A, 100 kV of accelerating voltage). The sheet samples were sliced in TD and dyed with $RuO_4$ in advance.

Wetting tension: Wetting tension of the surface of the films was measured substantially in accordance with ASTM D2578.

Heat seal strength: Heat seal strength of the films was measured by using a SENTINEL sealer model 12 ASL at 30 psi, 0.5 second dwell time, with heated flat upper seal jaw Teflon® coated, and unheated lower seal jaw, rubber with glass cloth-covered. The film is heat-sealed sealant-side to sealant-side at the desired seal temperature range and increments in the SENTINEL sealer (e.g. 180-290° F. at 10° F. increments (82-143° C. at 5.5° C. increments)) and then the respective seal strengths are measured using an Instron model 4201 tensile tester. The heat-sealed samples are cut into 1-inch (ca. 25 mm) wide strips, the two unsealed tails are placed in the upper and lower Instron clamps and the sealed tail supported at a 90° angle to the two unsealed tails for a 90° T-peel test. The peak and average seal strength is recorded.

Seal initiation temperature (SIT): Heat seal initiation temperature of the films was measured using the SENTINEL 12 ASL or LAKO TOOL SL10 hot tack sealer and method as described above. Heat seal initiation temperature was the lowest temperature at which minimum 200 g/25 mm seal strength is achieved.

Compostability: Degradability of the films was measured substantially in accordance with ASTM procedure D-6400 "Compostable Plastics," sub-group procedure D-5338 "Disintegration Test." This ASTM procedure is also known as ISO 1629 in the International Standards test procedures. In essence, the test films are aged under composting conditions of 58° C. for 180 days maximum duration in compost medium and films are observed and rated for disintegration. Preferably, the test films may degrade completely within 180 days (26 weeks) and more preferably, within 105 days (15 weeks).

Thickness variation in the transverse direction (TD): Thickness of the films was measured in the transverse directions as 2 inch (ca. 50 mm) interval by a thickness gauge, such as a micrometer by MITSUTOYO, and thickness variation along the width of 60 inches (ca. 152 cm) was calculated from the following equation: Thickness variation (%)=(maximum thickness−minimum thickness)/average thickness×100

Haze: Haze of the films was measured by measuring the haze of a single sheet of film using a hazemeter model (BYK Gardner "HAZE-GARD PLUS") substantially in accordance with ASTM D1003.

Coefficient of Friction (COF): COF of the films was measured with the use of a Testing Machine, Inc. slip tester (TMI-Model #32-06) substantially in accordance with ASTM D1894-95. The films were cut to specified sizes. One piece of film was clamped, the desired test surface of the sample up, onto an 18" (ca. 457 mm) MD (machine direction) and 6" (ca. 152 mm) TD (transverse direction) glass plate. Another piece of the film was mounted using double-sided tape to a 2.5" by 2.5" (6.35 cm by 6.35 cm) 200 g sled, with the desired test surface of the sample down. The sled was placed on top of the glass plate and attached to the load-sensing device. The sled was then moved over the film on the glass plate at 6 in/min (ca. 15.24 cm/min). The measuring distance used to calculate the value of static was 1" (ca. 2.54 cm) and 4" (ca. 10.16 cm) for dynamic COF Materials: Raw materials and master batches used in the Examples below are summarized in Table 1. Masterbatches for cavitation agents were obtained from venders as summarized in Table 1, while the masterbatches for antiblocking agents were prepared as follows: The carrier PLA pellets and the powder of particles were pre-blended at the ratio shown in Table 1 and mixed well in a conventional tumbler mixer. The blended materials were fed to a co-rotating twin screw extruder at 370° F. to 390° F. (187.8 to 198.9° C.) of the extruder temperature. The polymer melt was extruded through a 6-hole strand die that was set at 415° F. (212.8° C.) and the actual temperature of polymer flow was about 420° F. to 440° F. (215.6 to 226.7° C.). The melt strands were quenched in a water bath, and then pelletized by a Berlinger multi-knife cutter. The resulting size of the masterbatch pellets was about 40-60 pellets/gram. The pellets were dried and/or crystallized (if crystallizable), then sealed in a foil-lined bag to avoid moisture uptake during storage.

Examples/Comparative Examples 1 to 22

Materials were blended in accordance with Table 2-1 and dried to 200 ppm or less moisture content using a conventional dryer. Moisture content was measured via Karl-Fischer titration. The multilayer coextruded laminate sheet was extruded at the extrusion temperatures summarized in Table 3. The melt curtain was cast onto a cooling drum whose surface temperature was set at 25° C. to solidify the non-oriented laminate sheet. The non-oriented laminate sheet was stretched in the longitudinal direction (machine direction, MD) at 70° C. at a stretching ratio of 3 times the original length and the resulting stretched sheet was cooled down and heat-set or annealed at 25° C. to obtain a uniaxially oriented laminate sheet. The uniaxially oriented laminate sheet was introduced into a heated tenter and preliminarily heated at 65° C. and stretched in the transverse direction (TD) at 75° C. at a stretching ratio of 4 times the original width and then heat-set at 140° C. and then relaxed (5% toe-in exit rail width setting) in the TD at 120° C. to reduce internal stresses due to the orientation and minimize shrinkage and give a relatively thermally stable biaxially oriented film. The extruder output and line speed were adjusted to make the total film thickness as 20 μm after orientation. The output of each layer was also adjusted by respective screw speed corresponding to the desired layer thickness ratio shown in Table 2-1. After the heat setting process, the desired surface of the oriented film was treated as shown in Table 2-1 via corona discharge treatment at the watt-density in the range of 3.5 watts/sq. ft/min. The watt-density can be calculated by the following equation: Watt-density (watts/sq. ft/min)=corona wattages/line speed (feet/min)/film width (feet) Lastly, the film was wound in roll form. The properties and process feasibility of the films are summarized in Table 4-1. In Table 4-1, the noise level of Comparative Example 1 was used as the E0 of 20 μm sample.

Comparative Example 1 (CEx1) was a control PLA film made without any modifying polymer "A". Noise level from Table 4-1 shows 94 dB, which is considered a very loud and noisy film. Other properties such as compostability, mechanical strength, clarity, heat shrinkage, etc. were all acceptable. Examples 4 and 5 (Ex4, Ex5) show the improvement in noise level by adding 20 and 40 wt %, respectively, into the core layer of a noise modifying polymer "A"—in this case, Ecoflex® PBAT grade A1200. The noise level was significantly reduced compared to CEx1, at 88.5 and 82.3 dB, respectively for Ex4 and Ex5. Other properties for Ex4 and 5 were acceptable in terms of mechanical properties, heat shrinkage, and compostability. It was noted, however, that Ex5 had more difficulty with obtaining stable film flatness and was marginally acceptable in this regard. This issue may have been due to the relatively higher loading of the modifying polymer "A" in the core layer.

Comparative Examples 2 and 3 (CEx2, CEx3) used lower amounts of modifying polymer "A" (PBAT) in the core layer, at 5 wt % and 10 wt % respectively. Although processability and other film properties were good, noise level was still greater than 90 dB, at 93.3 and 92.5 dB respectively. In these comparative examples, the amount of modifying polymer "A" is not enough to dampen effectively the noise energy.

Comparative Example 6 (CEx6) uses a larger amount of modifying polymer "A" (PBAT) in the core layer at 60 wt %. Noise energy is further dampened to 81.7 dB compared to the previous examples, but as noted in Table 4-1, processability was much worse with unacceptable film flatness. In addition, heat shrinkage stability was much poorer at 15% MD and almost 14% TD shrinkage. This amount of shrinkage was not acceptable. Tensile properties were also weaker. In addition, the high loading of polymer "A" adds significantly more raw material cost for the additional benefit in noise reduction.

Examples 7 through 11 use other types of polymers as the modifying polymer "A": PHBV (ENMAT® Y1000P or MIREL® F3002 grades); PCL (DANIMER 28709 grade); or blends of PBAT with PHBV or PCL. Loadings of modifying polymer "A" in the core layer of these resins or blends of resins, was 20 wt % total. Noise level was reduced by these modifiers to less than 90.0, ranging from 89.0 to 83.4. Although film profile control and flatness was poor for Examples 7 and 8, mechanical properties and thermal shrinkage was acceptable. For Examples 9 to 11, film profile control and flatness was good as well as mechanical properties and thermal stability. Compostability was also maintained well with these Examples and cost was more economical since a lower loading of the polymer "A" in the core was effective in reducing noise energy and maintaining desirable properties.

Comparative Example 12 (CEx12) used a higher loading of a blend of modifying polymer "A" at 50 wt % total of the core layer. The polymer "A" was a blend of 25 wt % PBAT and 25 wt % PHBV in the core layer. This blend ratio in the core layer was a large percentage and raised raw material cost of the film significantly. Although noise energy was effectively dampened, measured as one of the lowest Examples at 82.0 dB, mechanical properties were worsened as shown by lower MD tensile strength, and thermal stability was worse, being marginal at about 10% MD/TD shrinkage.

Examples 13 and 14 (Ex13, Ex14) used blends of PBAT and PHBV as modifying polymer "A" in the core layer of 10 wt % of each resin respectively, for a total polymer "A" blend of 20 wt % of the core layer. In addition, 5 and 10 wt % of elastomer rubber SEBS (KRATON 1924X) was used, respectively. Noise level was also effectively reduced with these formulations compared to CEx1. Other properties such as tensile strength, film flatness, and thermal shrinkage were very good, and compostability was maintained despite the addition of the elastomer. Comparative Example 15 (CEx15), however, which was similar to Ex 13 and 14 for polymer "A" blend, used a higher loading of SEBS at 20 wt %. In this case, film processability was lost and a film sample could not be made. It is possible that the high loading of SEBS caused too much incompatible gels or phases for stable orientation.

Examples 16, 17, and 18 (Ex16, Ex17, Ex18) investigated using the modifying polymer "A" blend in both the core layer and one of the skin layers. Ex16 used a blend of 10 wt % PBAT and 15 wt % PHBV in the core layer as polymer "A"; and a blend of 10 wt % PBAT and 10 wt % PHBV as polymer "A" in the first skin layer. Ex17 was a variation of Ex16, wherein the core layer polymer "A" blend was 10 wt % PBAT and 10 wt % PHBV with 5 wt % SEBS; and the first skin layer used 10 wt % PBAT as polymer "A" plus 5 wt % of SEBS. Ex18 was a further variation in which the core layer polymer "A" blend was the same as Ex17, but the first skin layer used a polymer "A" blend of 10 wt % PBAT and 10 wt % PHBV with 5 wt % SEBS. These Examples were also effective in lowering noise level well below 90.0 dB. Tensile strength and heat shrinkage were good; compostability was maintained; film flatness and profile variation were slightly worse but acceptable.

Examples 19 through 21 (Ex19, Ex20, Ex 21) investigated using modifying polymer "A" blends in the core layer as well as mineral cavitating agents to produce a cavitated opaque film. For these Examples, the modifying polymer "A" was a blend of 10 wt % PBAT and 10 wt % PHBV of the core layer with 5 wt % SEBS. The first skin layer was again essentially 100 wt % amorphous PLA. In the case of Exs 19 and 20, a talc PLA masterbatch was used (Marval Industries TC4 grade) at 25 and 50 wt % of the core respectively, which equated to about 5 wt % and 10 wt % active talc cavitating agent respectively. Haze increased considerably, to over 90%, indicating cavitation and opacification of the film. Noise level was reduced to 87.3 and 85.1 dB respectively. Film tensile properties were acceptable, although MD tensile strength was deemed marginally acceptable for Ex20; compostability was maintained; and film processability and profile control were good. For Ex21, the same blended polymer "A" was used in the core layer but the mineral cavitating agent was changed to calcium carbonate ($CaCO_3$) PLA masterbatch at 16.7 wt % of the core layer, which equated to about 5 wt % active $CaCO_3$ cavitating agent. Haze was 96%, again indicating cavitation and opacification of the sheet; tensile properties were acceptable although marginally acceptable for the MD direction; compostability was maintained; noise level was reduced acceptably to 87.3 dB; but film processability was questionable as some film breaks were experienced.

Comparative Example 22 (CEx22) was also a cavitated structure similar to Ex21, except that the $CaCO_3$ PLA masterbatch was increased to 50 wt % of the core layer (15 wt % active $CaCO_3$). Haze increased further to 99% indicating increased cavitation and noise level was reduced further to 84.3 dB compared to Exs 19-21. However, MD and TD tensile strengths were very poor, particularly for the MD tensile strength, likely due to the high degree of cavitation and large void formation; in addition, film stability was very poor with many film breaks, also likely due to the very weak MD tensile strength.

Examples/Comparative Examples 23 to 29

Materials were blended in accordance with Table 2-2 and dried to 200 ppm or less moisture content using a conventional dryer. Moisture content was measured via Karl-Fischer titration. The mono-layer sheet was extruded at the processing temperatures summarized in Table 3. The melt curtain was cast onto a cooling drum whose surface temperature was set at 25° C. to solidify the non-oriented laminate sheet. The non-oriented laminate sheet was stretched in the longitudinal direction (machine direction, MD) at 70° C. at a stretching ratio of 3 times the original length and the resulting stretched sheet was cooled down and heat-set or annealed at 25° C. to obtain a uniaxially oriented laminate sheet. The uniaxially oriented laminate sheet was introduced into a heated tenter and preliminarily heated at 65° C. and stretched in the transverse direction (TD) at 75° C. at a stretching ratio of 4 times the original width and then heat-set at 140° C. and then relaxed (5% toe-in of the exit rail width setting) in the TD at 120° C. to reduce internal stresses due to the orientation and minimize shrinkage and give a relatively thermally stable biaxially oriented film. The extruder output and line speed were adjusted to make the total film thickness as shown in Table 2-2. After the heat-setting process, the desired surface of the oriented film was treated as shown in Table 2-2 via corona discharge treatment at the watt-density in the range of 3.5 watts/sq. ft/min. The watt-density can be calculated by the following equation: Watt-density (watts/sq. ft/min)=corona wattages/line speed (feet/min)/film width (feet). Lastly, the film was wound in roll form. The properties and process feasibility of the films are summarized in Table 4-2. In Table 4-2, the noise level of Comparative Example 23, Comp Example 25 and Comp Example 28 were used as the E0 of 9 µm, 17 µm, and 35 µm thickness films, respectively.

Comparative Examples 23, 25, and 28 (CEx23, CEx25, CEx28) were control films of essentially 100 wt % PLA made at different thicknesses. As shown in Table 4-2, the noise levels of these Comparative Examples were all in excess of 90 dB, which were considered undesirably loud. It was observed that as thickness of the film was increased, noise level of the film also increased progressively (e.g. CEx23 at 9 µm showed noise level 92.8 dB vs. CEx28 at 35 µm with noise level 94.6 dB). However, mechanical properties, thermal stability (shrinkage), compostability, and film profile control and processability were all very good.

Examples 24, 26, and 29 (Ex24, Ex26, Ex29) were "quiet" versions of the respective Comparative Examples described above. These Examples used a blend of modifying polymer "A" including 10 wt % PBAT and 10 wt % PBHV with 5 wt % SEBS in the base layer and were extruded and oriented at thicknesses of 9 µm, 17 µm, and 35 µm, respectively. Each of these examples demonstrated a significantly lower noise level than its Comparative Example counterpart: Ex24 at 9 µm had a noise level of 84.6 dB vs. its counterpart in CEx23 at 92.8 dB; Ex26 at 17 µm thickness had a noise level of 85.6 vs. its counterpart in CEx25 at 93.7 dB; and Ex29 at 35 µm had a noise level of 86.5 vs. its counterpart CEx28 at 94.6 dB. In addition, the Examples' tensile strengths, heat shrinkage, compostability, and film profile control and processability were all acceptable.

Example 27 (Ex27) was a variation of Ex26 in which the amount of modifying polymer "A" was essentially doubled: 20 wt % PBAT and 20 wt % PHBV was used, with 5 wt % SEBS, in the base layer. In comparison to Ex26, noise level was further reduced to 81.9 dB due to the increased amount of polymer "A" blend. Tensile properties, thermal stability, compostability, and profile control were acceptable, although some sticking issues were observed during film processing. In addition, the higher loading of polymer "A" types could add higher cost to the film.

Examples of Downstream Converting Processes (1) Coating

To confirm the coating process feasibility of the base films produced above, the representative rolls from the Examples and Comparative Examples summarized in Table 4 were placed on an off-line reverse gravure solution coater to coat a water-borne polymeric gas barrier solution including a blend of PVOH and EVOH and crosslinker as detailed in U.S. patent application Ser. No. 12/890,349 which is wholly incorporated by reference. A suitable barrier coating blend can be comprised of Kuraray EVALCA® RS-117 ethylene vinyl alcohol of about 97.5-99.0% hydrolysis at 3.71 wt % non-volatile solids (NVS) and Celanese Celvol® 24-203 polyvinyl alcohol of about 88.0% hydrolysis at 7.72 wt % NVS, and glyoxal crosslinker such as Emerald Performance Materials Freechem® 40DL at 1.62 wt % NVS. An amount of Air Products Surfynol® 420 defoamer at 0.09 wt % NVS was also added. Total NVS % was 13.14. The coating was applied using a 200 line screen Quad gravure cylinder in a reverse-gravure open pan applicator with a backing roll. After drying in an air-flotation oven such that the PLA-based substrate has minimal shrinkage from thermal drying (e.g. less than 0.5% thermal shrinkage), the dried coating weight was about 0.20-0.25 µm thick. The rolls were coated at a line speed of about 400-600 feet/min (122-183 m/min), at 76-88° C. drying temperature via 3-zone air flotation oven to minimize thermal shrinkage. Processability notes are summarized in Table 5.

(2) Metallizing

To confirm the metallizing process feasibility of the base films produced above, the representative rolls from the above Examples and Comparative Examples summarized in Table 5 were placed inside a vacuum chamber metallizer for vapor deposition metallization using aluminum. The treated surface of the film could be preferentially used for the metal receiving surface. The rolls were then metallized to a nominal optical density target of 2.4 at the line speed of 1000 feet/min (ca. 305 m/min). Processability notes are summarized in Table 5.

(3) Laminating

To confirm the laminating process feasibility of the base films produced above, the representative rolls from the above Examples and Comparative Examples summarized in Table 5 were placed on a dry laminator. The rolls were coated with a solvent-borne polyurethane-based adhesive with cross-linker (ADCOTE 522 isocynate terminated polyurethane from Dow Chemical and ADCOTE 522B co-reactant from Dow Chemical, respectively). 100 μarts ADCOTE 522/100 μarts Ethyl Acetate dilutant/4 parts 522B co-reactant were mixed and applied at 2 lb/ream as dry weight. The line speed was 150 feet/min (ca. 46 m/min), at 150° F. (ca. 65.5° C.) of the drying temperature. Comp Example 1 film was used as a secondary web which was laminated to each film in Table 5 at 180° F. (82.2° C.) of lamination temperature with 40 μsi (275.8 kPa) nipping pressure. Processability notes are summarized in Table 5.

In general, the selected Examples and Comparative Examples were put through downstream converting operations of coating, metallizing, and adhesive lamination. In the Coating process, most examples could be coated successfully with the exception of CEx22 in which this highly cavitated film with poor tensile strength broke repeatedly. Ex5, CEx6, and CEx12, which utilized higher loadings of modifying polymer "A" blends (i.e. 40-50 wt % of the core layer), tended to experience more issues with shrinkage and curling during drying of the coating. Those examples with higher TD profile variation also tended to have uneven coating thickness uniformity.

In Metallizing, most of the examples were successfully metallized; again, the exception was CEx22, which experienced a severe amount of film breakage. Those examples—such as CEx6 and CEx12—which had high loadings of polymer "A" (50-60 wt % of core layer, respectively) also were observed to have some film breaks, although not to the extent whereby metallizing could not be done.

In the Lamination process, most of the examples could be successfully laminated except for CEx22 in which no suitable sample was available (due to film breaks seen in the previous converting steps). However, those examples with a high loading of polymer "A" (CEx6 and CEx12) exhibited more curling and heat shrinkage issues during drying and lamination of the laminate.

TABLE 1

| Category | Substance | Grade name | Manufacture | Tm/° C. | Tg/° C. |
|---|---|---|---|---|---|
| PLA | crystalline PLA d % = 1.4 | INGEO 4032D | NatureWorks LLC, USA | 150 | 55 |
|  | amorphous PLA d % = 12 | INGEO 4060D | NatureWorks LLC, USA | 150 | 55 |
| Modifier | PBAT | ECOFLEX F BLEND A1200 | BASF, Germany | 120 | −30 |
| Polymer A | PHBV | ENMAT Y1000P | Tianan Biologic Materials, Inc., China | 167 | −5-0 |
|  | PHBV | MIREL F3002 | Metabolix, USA | 160-165 | −5-0 |
|  | PCL | MEREDIAN 28709 | Danimer Scientific LLC, USA | 56 | −30 |
| Elastomer | MH grafted SEBS | KRATON 1924X | KRATON Polymers LLC | — | −90 (polybutadiene portion) |
| Cavitation agent (as masterbatch) | 20 wt % 4.0 μm talc in 4032D | NATURAL PLA-TC4 | Marval Industries, Inc., USA | — | — |
|  | 30 wt % 1.4 μm CaCO$_3$ in 4032D | NATURAL PLA-CF30 | Marval Industries, Inc., USA | — | — |
| Antiblocking agent (as masterbatch) | 5 wt % 2 μm spherical sodium calcium aluminum silicate* in 4060D | MB A | *Silton JC-20 from Mizusawa Industrial Chemicals Ltd., Japan | — | — |
|  | 5 wt % 3 μm spherical sodium calcium aluminum silicate** in 4060D | MB B | **Silton JC-30 from Mizusawa Industrial Chemicals Ltd., Japan | — | — |

TABLE 2-1

|  |  | Comp Ex 1 | | Comp Ex 2 | | Comp Ex 3 | | Ex 4 | | Ex 5 | | Comp Ex 6 | |
|---|---|---|---|---|---|---|---|---|---|---|---|---|---|
|  |  | Thickness/μm | | | | | | | | | | | |
|  |  | 2.5 | | 2.5 | | 2.5 | | 2.5 | | 2.5 | | 2.5 | |
|  | Blend | Name | wt % | Name | wt % | Name | wt % | Name | wt % | Name | wt % | Name | wt % |
| First skin layer | PLA | 4060D | 97 | 4060D | 97 | 4060D | 97 | 4060D | 97 | 4060D | 97 | 4060D | 97 |
|  | Polymer A | n/a | n/a | n/a | n/a | n/a | n/a | n/a | n/a | n/a | n/a | n/a | n/a |
|  | Other | MB B | 3 | MB B | 3 | MB B | 3 | MB B | 3 | MB B | 3 | MB B | 3 |
|  | Corona treatment | No | | No | | No | | No | | No | | No | |
|  |  | Thickness/μm | | | | | | | | | | | |
|  |  | 16 | | 16 | | 16 | | 16 | | 16 | | 16 | |
|  | Blend | Name | wt % | Name | wt % | Name | wt % | Name | wt % | Name | wt % | Name | wt % |
| Core layer | PLA | 4032D | 85 | 4032D | 80.8 | 4032D | 76.5 | 4032D | 68 | 4032D | 51 | 4032D | 34 |
|  |  | 4060D | 15 | 4060D | 14.2 | 4060D | 13.5 | 4060D | 12 | 4060D | 9 | 4060D | 6 |

TABLE 2-1-continued

|  |  | | | | | | | | | | | |
|---|---|---|---|---|---|---|---|---|---|---|---|---|
|  | Polymer A | n/a | n/a | A1200 | 5 | A1200 | 10 | A1200 | 20 | A1200 | 40 | A1200 | 60 |
|  | Other | n/a | n/a | n/a | n/a | n/a | n/a | n/a | n/a | n/a | n/a | n/a | n/a |

|  |  | Thickness/μm | | | | | | | | | | |
|---|---|---|---|---|---|---|---|---|---|---|---|---|
|  |  | 1.5 | | 1.5 | | 1.5 | | 1.5 | | 1.5 | | 1.5 | |
|  | Blend | Name | wt % | Name | wt % | Name | wt % | Name | wt % | Name | wt % | Name | wt % |
| Second skin layer | PLA | 4032D | 85 | 4032D | 85 | 4032D | 85 | 4032D | 85 | 4032D | 85 | 4032D | 85 |
|  |  | 4060D | 14 | 4060D | 14 | 4060D | 14 | 4060D | 14 | 4060D | 14 | 4060D | 14 |
|  | Polymer A | n/a | n/a | n/a | n/a | n/a | n/a | n/a | n/a | n/a | n/a | n/a | n/a |
|  | Other | MB A | 1 | MB A | 1 | MB A | 1 | MB A | 1 | MB A | 1 | MB A | 1 |
|  | Corona treatment | No | | No | | No | | No | | No | | No | |

|  |  | Ex 7 | | Ex 8 | | Ex 9 | | Ex 10 | | Ex 11 | | Comp Ex 12 | |
|---|---|---|---|---|---|---|---|---|---|---|---|---|---|
|  |  | Thickness/μm | | | | | | | | | | | |
|  |  | 2.5 | | 2.5 | | 2.5 | | 2.5 | | 2.5 | | 2.5 | |
|  | Blend | Name | wt % | Name | wt % | Name | wt % | Name | wt % | Name | wt % | Name | wt % |
| First skin layer | PLA | 4060D | 97 | 4060D | 97 | 4060D | 97 | 4060D | 97 | 4060D | 97 | 4060D | 97 |
|  | Polymer A | n/a | n/a | n/a | n/a | n/a | n/a | n/a | n/a | n/a | n/a | n/a | n/a |
|  | Other | MB B | 3 | MB B | 3 | MB B | 3 | MB B | 3 | MB B | 3 | MB B | 3 |
|  | Corona treatment | No | | No | | No | | No | | No | | No | |

|  |  | Thickness/μm | | | | | | | | | | |
|---|---|---|---|---|---|---|---|---|---|---|---|---|
|  |  | 16 | | 16 | | 16 | | 16 | | 16 | | 16 | |
|  | Blend | Name | wt % | Name | wt % | Name | wt % | Name | wt % | Name | wt % | Name | wt % |
| Core layer | PLA | 4032D | 68 | 4032D | 68 | 4032D | 68 | 4032D | 68 | 4032D | 68 | 4032D | 42.5 |
|  |  | 4060D | 12 | 4060D | 12 | 4060D | 12 | 4060D | 12 | 4060D | 12 | 4060D | 7.5 |
|  | Polymer A | Y1000P | 20 | 28709 | 20 | A1200 | 10 | A1200 | 10 | A1200 | 10 | A1200 | 25 |
|  |  |  |  |  |  | Y1000P | 10 | F3002 | 10 | 28709 | 10 | Y1000P | 25 |
|  | Other | n/a | n/a | n/a | n/a | n/a | n/a | n/a | n/a | n/a | n/a | n/a | n/a |

|  |  | Thickness/μm | | | | | | | | | | |
|---|---|---|---|---|---|---|---|---|---|---|---|---|
|  |  | 1.5 | | 1.5 | | 1.5 | | 1.5 | | 1.5 | | 1.5 | |
|  | Blend | Name | wt % | Name | wt % | Name | wt % | Name | wt % | Name | wt % | Name | wt % |
| Second skin layer | PLA | 4032D | 85 | 4032D | 85 | 4032D | 85 | 4032D | 85 | 4032D | 85 | 4032D | 85 |
|  |  | 4060D | 14 | 4060D | 14 | 4060D | 14 | 4060D | 14 | 4060D | 14 | 4060D | 14 |
|  | Polymer A | n/a | n/a | n/a | n/a | n/a | n/a | n/a | n/a | n/a | n/a | n/a | n/a |
|  | Other | MB A | 1 | MB A | 1 | MB A | 1 | MB A | 1 | MB A | 1 | MB A | 1 |
|  | Corona treatment | No | | No | | No | | No | | No | | No | |

|  |  | Ex 13 | | Ex 14 | | Comp Ex 15 | | Ex 16 | | Ex 17 | | Ex 18 | |
|---|---|---|---|---|---|---|---|---|---|---|---|---|---|
|  |  | Thickness/μm | | | | | | | | | | | |
|  |  | 2.5 | | 2.5 | | 2.5 | | 2.5 | | 2.5 | | 4 | |
|  | Blend | Name | wt % | Name | wt % | Name | wt % | Name | wt % | Name | wt % | Name | wt % |
| First skin layer | PLA | 4060D | 97 | 4060D | 97 | 4060D | 97 | 4060D | 77 | 4032D | 69.7 | 4060D | 77 |
|  |  |  |  |  |  |  |  |  |  | 4060D | 12.3 |  |  |
|  | Polymer A | n/a | n/a | n/a | n/a | n/a | n/a | A1200 | 10 | A1200 | 10 | A1200 | 10 |
|  |  |  |  |  |  |  |  | Y1000P | 10 |  |  | Y1000P | 10 |
|  | Other | MB B | 3 | MB B | 3 | MB B | 3 | MB B | 3 | 1924X | 5 | MB B | 3 |
|  |  |  |  |  |  |  |  |  |  | MB B | 3 |  |  |
|  | Corona treatment | No | | No | | No | | No | | Yes | | No | |

|  |  | Thickness/μm | | | | | | | | | | |
|---|---|---|---|---|---|---|---|---|---|---|---|---|
|  |  | 16 | | 16 | | 16 | | 16 | | 16 | | 12 | |
|  | Blend | Name | wt % | Name | wt % | Name | wt % | Name | wt % | Name | wt % | Name | wt % |
| Core layer | PLA | 4032D | 63.8 | 4032D | 59.5 | 4032D | 51 | 4032D | 63.8 | 4032D | 63.8 | 4032D | 63.8 |
|  |  | 4060D | 11.2 | 4060D | 10.5 | 4060D | 9 | 4060D | 11.2 | 4060D | 11.2 | 4060D | 11.2 |
|  | Polymer A | A1200 | 10 | A1200 | 10 | A1200 | 10 | A1200 | 10 | A1200 | 10 | A1200 | 10 |

TABLE 2-1-continued

| | | | | | | | | | | | | |
|---|---|---|---|---|---|---|---|---|---|---|---|---|
| | Other | Y1000P | 10 | Y1000P | 10 | Y1000P | 10 | Y1000P | 15 | Y1000P | 10 | Y1000P | 10 |
| | | 1924X | 5 | 1924X | 10 | 1924X | 20 | n/a | n/a | 1924X | 5 | 1924X | 5 |

| | | Thickness/μm | | | | | |
|---|---|---|---|---|---|---|---|
| | | 1.5 | 1.5 | 1.5 | 1.5 | 1.5 | 4 |
| | Blend | Name wt % | Name wt % | Name wt % | Name wt % | Name wt % | Name wt % |
| Second skin layer | PLA | 4032D 85 | 4032D 85 | 4032D 85 | 4060D 99 | 4032D 85 | 4060D 99 |
| | | 4060D 14 | 4060D 14 | 4060D 14 | | 4060D 5 | |
| | Polymer A | n/a n/a | n/a n/a | n/a n/a | n/a n/a | n/a n/a | n/a n/a |
| | Other | MB A 1 | MB A 1 | MB A 1 | MB A 1 | MB A 4 | MB A 1 |
| | | | | | | MB B 6 | |
| | Corona treatment | No | No | No | No | No | No |

| | | Ex 19 | Ex 20 | Ex 21 | Comp Ex 22 |
|---|---|---|---|---|---|
| | | Thickness/μm | | | |
| | | 2.5 | 2.5 | 2.5 | 2.5 |
| | Blend | Name wt % | Name wt % | Name wt % | Name wt % |
| First skin layer | PLA | 4060D 97 | 4060D 97 | 4060D 97 | 4060D 97 |
| | Polymer A | n/a n/a | n/a n/a | n/a n/a | n/a n/a |
| | Other | MB B 3 | MB B 3 | MB B 3 | MB B 3 |
| | Corona treatment | No | No | No | No |

| | | Thickness/μm | | | |
|---|---|---|---|---|---|
| | | 16 | 16 | 16 | 16 |
| | Blend | Name wt % | Name wt % | Name wt % | Name wt % |
| Core layer | PLA | 4032D 38.7 | 4032D 13.7 | 4032D 47.0 | 4032D 13.7 |
| | | 4060D 11.3 | 4060D 11.3 | 4060D 11.3 | 4060D 11.3 |
| | Polymer A | A1200 10 | A1200 10 | A1200 10 | A1200 10 |
| | | Y1000P 10 | Y1000P 10 | Y1000P 10 | Y1000P 10 |
| | Other | 1924X 5 | 1924X 5 | 1924X 5 | 1924X 5 |
| | | TC4 25 | TC4 50 | CF-30 16.7 | CF-30 50 |

| | | Thickness/μm | | | |
|---|---|---|---|---|---|
| | | 1.5 | 1.5 | 1.5 | 1.5 |
| | Blend | Name wt % | Name wt % | Name wt % | Name wt % |
| Second skin layer | PLA | 4032D 85 | 4032D 85 | 4032D 85 | 4032D 85 |
| | | 4060D 14 | 4060D 14 | 4060D 14 | 4060D 14 |
| | Polymer A | n/a n/a | n/a n/a | n/a n/a | n/a n/a |
| | Other | MB A 1 | MB A 1 | MB A 1 | MB A 1 |
| | Corona treatment | No | No | No | No |

TABLE 2-2

| | | Comp Ex 23 | Ex 24 | Comp Ex 25 | Ex 26 |
|---|---|---|---|---|---|
| | | Thickness/μm | | | |
| | | 9 | 9 | 17 | 17 |
| | Blend | Name wt % | Name wt % | Name wt % | Name wt % |
| Core (mono) layer | PLA | 4032D 85 | 4032D 63.7 | 4032D 85 | 4032D 63.7 |
| | | 4060D 9 | 4060D 5.3 | 4060D 9 | 4060D 5.3 |
| | Polymer A | n/a n/a | A1200 10 | n/a n/a | A1200 10 |
| | | | Y1000P 10 | | Y1000P 10 |

TABLE 2-2-continued

|  |  |  |  |  |  |  |  |  |
|---|---|---|---|---|---|---|---|---|
| Other | MB B | 6 | 1924X | 5 | MB B | 6 | 1924X | 5 |
|  |  |  | MB B | 6 |  |  | MB B | 6 |
| Corona treatment | One side | | One side | | One side | | One side | |

|  | Ex 27 | | Comp Ex 28 | | Ex 29 | |
|---|---|---|---|---|---|---|
|  | | | Thickness/μm | | | |
|  | 17 | | 35 | | 35 | |
| Blend | Name | wt % | Name | wt % | Name | wt % |
| Core (mono) layer PLA | 4032D | 41.7 | 4032D | 85 | 4032D | 63.7 |
|  | 4060D | 7.3 | 4060D | 9 | 4060D | 5.3 |
| Polymer A | A1200 | 20 | n/a | n/a | A1200 | 10 |
|  | Y1000P | 20 |  |  | Y1000P | 10 |
| Other | 1924X | 5 | MB B | 6 | 1924X | 5 |
|  | MB B | 6 |  |  | MB B | 6 |
| Corona treatment | One side | | One side | | One side | |

TABLE 3

| | Example/Comp Example No. | | | | |
|---|---|---|---|---|---|
| | 1 | 2, 3 | 4-15, 17, 19-22 | 16 | 18 |
| First skin layer Extrusion temp/° C. | 204 | 204 | 204 | 193 | 193 |
| Core layer Extrusion temp/° C. | 210 | 204 | 193 | 193 | 193 |
| Second skin layer | 210 | 210 | 210 | 204 | 204 |

TABLE 3-continued

Extrusion temp/° C.

| | Example/Comp Example No. | |
|---|---|---|
| | 23, 25, 28 | 24, 26, 27, 29 |
| Core layer Extrusion temp/° C. | 210 | 193 |

TABLE 4-1

|  |  | Comp Ex 1 | Comp Ex 2 | Comp Ex 3 | Ex 4 | Ex 5 | Comp Ex 6 | Ex 7 | Ex 8 |
|---|---|---|---|---|---|---|---|---|---|
| Tensile Strength | MD | 13800 | 12500 | 11700 | 11400 | 7100 | 5800 | 7500 | 8200 |
| psi | TD | 23400 | 18500 | 14400 | 13200 | 8900 | 7600 | 9300 | 10000 |
| Heat shrinkage % | MD | 2.7 | 3.0 | 3.3 | 4.6 | 8.6 | 15.0 | 4.9 | 4.7 |
| 120° C. × 15 min | TD | 1.5 | 1.7 | 1.9 | 4.0 | 7.9 | 13.9 | 2.8 | 2.6 |
| Wetting tension | First skin | 38 | 38 | 38 | 38 | 38 | 38 | 38 | 38 |
| mN/m | Second skin | 38 | 38 | 38 | 38 | 38 | 38 | 38 | 38 |
| Heat seal strength | 1st/1st | 430 | 470 | 480 | 460 | 480 | 470 | 470 | 460 |
| g/in | 1st/2nd | 0 | 0 | 0 | 0 | 0 | 0 | 0 | 0 |
| SIT | 1st/1st | 210 | 210 | 210 | 210 | 210 | 210 | 210 | 210 |
| ° F. | 1st/2nd | n/a | n/a | n/a | n/a | n/a | n/a | n/a | n/a |
| CoF static/dynamic | 1st/2nd | 0.41/0.39 | 0.41/0.38 | 0.43/0.39 | 0.41/0.39 | 0.42/0.37 | 0.42/0.39 | 0.41/0.38 | 0.40/0.36 |
| Compostability |  | <15 week | <15 week | <15 week | <15 week | <15 week | <15 week | <15 week | <15 week |
| Noise level dB |  | 94.0 | 93.3 | 92.5 | 88.5 | 82.3 | 81.7 | 89.0 | 89.0 |
| delta Noise level dB | E0-E | — | 0.7 | 1.5 | 5.5 | 11.7 | 12.3 | 5.0 | 5.0 |
| Center Frq Hz |  | 4479 | 4134 | 4084 | 3913 | 3618 | 3790 | 3948 | 3962 |
| Haze % |  | 4 | 6 | 8 | 9 | 9 | 10 | 10-20 | 10-20 |
| TD thickness var % |  | 3.3 | 3.8 | 4.0 | 4.5 | 11.3 | 16.2 | 15.1 | 14.9 |
| Film making process note |  | No issue | No issue | No issue | No issue | Some uneven stretching, flatness | Severe uneven stretching, poor flatness | Severe uneven stretching, poor flatness | Severe uneven stretching, poor flatness |

|  |  | Ex 9 | Ex 10 | Ex 11 | Comp Ex 12 | Ex 13 | Ex 14 | Comp Ex 15 | Ex 16 |
|---|---|---|---|---|---|---|---|---|---|
| Tensile Strength | MD | 10400 | 10500 | 10100 | 6400 | 10400 | 10900 | n/a | 10100 |
| psi | TD | 11400 | 11500 | 11200 | 7900 | 17000 | 16500 | n/a | 16800 |
| Heat shrinkage % | MD | 4.1 | 4.4 | 4.0 | 10.3 | 4.2 | 4.9 | n/a | 4.2 |
| 120° C. × 15 min | TD | 2.9 | 2.7 | 2.8 | 10.2 | 2.7 | 3.9 | n/a | 2.8 |
| Wetting tension | First skin | 38 | 38 | 38 | 38 | 38 | 38 | n/a | 38 |
| mN/m | Second skin | 38 | 38 | 38 | 38 | 38 | 38 | n/a | 38 |
| Heat seal strength | 1st/1st | 480 | 480 | 470 | 460 | 460 | 480 | n/a | 480 |
| g/in | 1st/2nd | 0 | 0 | 0 | 0 | 0 | 0 | n/a | 340 |
| SIT | 1st/1st | 210 | 210 | 210 | 210 | 210 | 210 | n/a | 210 |
| ° F. | 1st/2nd | n/a | n/a | n/a | n/a | n/a | n/a | n/a | 200 |
| CoF static/dynamic | 1st/2nd | 0.40/0.37 | 0.43/0.40 | 0.42/0.39 | 0.41/0.38 | 0.40/0.38 | 0.41/0.39 | n/a | 0.49/0.47 |
| Compostability |  | <15 week | <15 week | <15 week | <15 week | <15 week | 15-26 week | n/a | <15 week |
| Noise level dB |  | 84.8 | 82.7 | 83.4 | 82.0 | 85.4 | 85.0 | n/a | 83.9 |
| delta Noise level dB | E0-E | 9.2 | 11.3 | 10.6 | 12.0 | 8.6 | 9.0 | n/a | 10.1 |
| Center Frq Hz |  | 4034 | 3962 | 3969 | 3734 | 3962 | 3875 | n/a | 4005 |
| Haze % |  | 12 | 12 | 12 | 18 | 12 | 12 | n/a | 16 |

TABLE 4-1-continued

| | | | | | | | | | |
|---|---|---|---|---|---|---|---|---|---|
| TD thickness var % | | 4.9 | 4.8 | 4.7 | 12.1 | 4.8 | 5.0 | n/a | 8.2 |
| Film making process note | | No issue | No issue | No issue | Slight uneven stretching | No issue | No issue | Hard to make sheet | Slight uneven stretching |

| | | Ex 17 | Ex 18 | Ex 19 | Ex 20 | Ex 21 | Comp Ex 22 |
|---|---|---|---|---|---|---|---|
| Tensile Strength | MD | 10600 | 9800 | 7400 | 6800 | 6900 | 2200 |
| psi | TD | 17500 | 15400 | 15000 | 13900 | 14100 | 7600 |
| Heat shrinkage % | MD | 4.1 | 5.6 | 4.5 | 4.3 | 4.4 | 4.2 |
| 120° C. × 15 min | TD | 2.6 | 4.5 | 2.9 | 3.0 | 2.8 | 2.6 |
| Wetting tension | First skin | 41 | 38 | 38 | 38 | 38 | 38 |
| mN/m | Second skin | 38 | 38 | 38 | 38 | 38 | 38 |
| Heat seal strength | 1st/1st | 0 | 530 | 470 | 480 | 460 | 460 |
| g/in | 1st/2nd | 0 | 520 | 0 | 0 | 0 | 0 |
| SIT | 1st/1st | n/a | 210 | 210 | 210 | 210 | 210 |
| ° F. | 1st/2nd | n/a | 200 | n/a | n/a | n/a | n/a |
| CoF static/dynamic | 1st/2nd | 0.38/0.33 | 0.67/0.61 | 0.38/0.32 | 0.35/0.29 | 0.34/0.28 | 0.32/0.29 |
| Compostability | | <15 week | <15 week | <15 week | <15 week | <15 week | <15 week |
| Noise level dB | | 85.0 | 82.2 | 87.3 | 85.1 | 87.3 | 84.3 |
| delta Noise level dB | E0-E | 9.0 | 11.8 | 6.7 | 8.9 | 6.7 | 9.7 |
| Center Frq Hz | | 4002 | 3951 | 3790 | 3685 | 3934 | 3856 |
| Haze % | | 16 | 14 | 95 | 98 | 96 | 99 |
| TD thickness var % | | 7.9 | 13.2 | 8.9 | 9.5 | 9.6 | 12.3 |
| Film making process note | | Slight uneven stretching, | Some uneven stretching flatness | No issue | No issue | Occasional film breaks | Film very brittle, frequent film breaks |

TABLE 4-2

| | | Comp Ex 23 | Ex 24 | Comp Ex 25 | Ex 26 | Ex 27 | Comp Ex 28 | Ex 29 |
|---|---|---|---|---|---|---|---|---|
| Tensile Strength | MD | 11200 | 9300 | 13200 | 10200 | 9500 | 13800 | 10600 |
| psi | TD | 18800 | 13500 | 23700 | 16500 | 15200 | 24100 | 18100 |
| Heat shrinkage % | MD | 2.9 | 4.3 | 2.7 | 4.4 | 5.0 | 2.7 | 4.4 |
| 120° C. × 15 min | TD | 1.3 | 2.7 | 1.5 | 2.9 | 3.1 | 1.5 | 2.8 |
| Wetting tension | Treated side | 40 | 41 | 40 | 40 | 41 | 40 | 41 |
| mN/m | Non treated side | 38 | 38 | 38 | 38 | 38 | 38 | 38 |
| CoF static/dynamic | A side/B side | 0.46/0.40 | 0.61/0.53 | 0.48/0.42 | 0.63/0.56 | 0.60/0.51 | 0.49/0.41 | 0.60/0.51 |
| Compostability | | <15 week | <15 week | <15 week | <15 week | <15 week | <15 week | <15 week |
| Noise level dB | | 92.8 | 84.6 | 93.7 | 85.6 | 81.9 | 94.6 | 86.5 |
| delta Noise level dB | E0-E | — | 8.2 | — | 8.1 | 11.8 | — | 8.1 |
| Center Frq Hz | | 4656 | 4098 | 4551 | 4049 | 3901 | 4317 | 3923 |
| Haze % | | 4 | 13 | 7 | 16 | 18 | 8 | 19 |
| TD thickness var % | | 2.9 | 4.3 | 3 | 4.5 | 6.4 | 4.7 | 5.9 |
| Process note | | | | | | Film is sticky to the heated MDS rolls | | |

TABLE 5

| | Ex/Comp Ex No. | | | | | | | | | |
|---|---|---|---|---|---|---|---|---|---|---|
| | CEx 1 | Ex 4 | Ex 5 | CEx 6 | Ex 7 | Ex 9 | CEx 12 | Ex 13 | Ex 18 | Ex 19 | CEx 22 |
| Process note at Coating | No issue | No issue | Uneven coating Slightly shrinking | Curly, shrinking | Uneven coating | No issue | Uneven coating Curly, shrinking | No issue | Uneven coating | No issue | Could not run due to many film breaks |
| Process note at Metallizing | No issue | No issue | No issue | Some film breaks | One film break | No issue | Some film breaks | No issue | No issue | No issue | Could not run due to many film breaks |
| Process note at Laminating | No issue | No issue | No issue | Curly, shrinking | No issue | No issue | Curly, shrinking | No issue | No issue | No issue | Could not run due to many film breaks |

In conclusion, PLA-based film designs and formulations using a modifying polymer with $T_g$ of 0° C. or less have been developed that can significantly reduce the noise level of unmodified PLA films. Such modified PLA films can exhibit acceptable mechanical properties, appearance, thermal stability, film profile/thickness variation control, and processability such that film-making and downstream converting processes can be maintained at productive and cost-effective levels. Furthermore, compostability or biodegradability of the films can be maintained at similar degradation rates as unmodified PLA-based films, particularly if the modifying polymer is a biodegradable polymer itself. In addition, it is expected that gas and moisture barrier properties of the films can be similar—or even better (based on possible gas and moisture vapor improvement due to formation of a tortuous path in the modified layer)—to unmodified PLA-based films.

This application discloses several numerical ranges in the text and figures. The numerical ranges disclosed inherently support any range or value within the disclosed numerical ranges even though a precise range limitation is not stated verbatim in the specification because this invention can be practiced throughout the disclosed numerical ranges.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. Finally, the entire disclosure of the patents and publications referred in this application are hereby incorporated herein by reference.

We claim:

1. A biaxially oriented polylactic acid film comprising a quiet layer comprising polylactic acid (PLA) polymer, at least one elastomer E, and a biodegradable polymer A comprising polyhydroxybutyrate-valerate, polybutylene-adipate-co-terephthalate, polybutylene-succinate, polybutylene-succinate-adipate, or PH(R)A R=C2-C10, wherein the quiet layer is a core layer and complies with the following conditions:

$60\% \leq wt \%(PLA) \leq 90\%$ $T_g(A) \leq 0°$ C.

$20\% \leq wt \%(A) \leq 40\%$ $1\% \leq wt \%(E) \leq 10\%$ in which,
$T_g$ (A) is a glass transition temperature of the biodegradable polymer A,
wt % (A) is a weight % of the biodegradable polymer A in the quiet layer,
wt % (PLA) is a weight % of polylactic acid in the quiet layer;
wt % (E) is a weight % of the at least one elastomer E in the quiet layer; and
wherein the heat shrinkage of the film is 10% or less at 120° C.×15 min in both a machine direction (MD) and a transverse direction (TD), a strength at break of the film is 7000 psi or more in both the MD and the TD direction, the polymer A forms a layered structure in the quiet layer and the at least one elastomer E exists in the layered structure, and the film complies with the following condition:

$E0 - E \geq 5$ dB in which,
E0 is a noise level of a biaxially oriented polylactic acid film consisting essentially of polylactic acid (dB),
E is a noise level of a biaxially oriented polylactic acid film with polymer A (dB).

2. The biaxially oriented polylactic acid film of claim 1, wherein the biodegradable polymer A forms a layered structure in the quiet layer.

3. The biaxially oriented polylactic acid film of claim 1, wherein the film has a total thickness of 30 μm or less.

4. The biaxially oriented polylactic acid film of claim 1, wherein the elastomer E is styrenic block copolymer (SBC).

5. The biaxially oriented polylactic acid film of claim 4, wherein the SBC is styrene-ethylene/butylene-styrene, styrene-ethylene/propylene-styrene, or a mixture thereof.

6. The biaxially oriented polylactic acid film of claim 4, wherein the SBC is grafted with maleic anhydride.

7. The biaxially oriented polylactic acid film of claim 1, further comprising at least one mineral cavitation agent, and wherein the following condition holds:

$0.5\% \leq wt \%(M) \leq 15\%$ in which:
wt % (M) is a weight % of the mineral cavitation agent M in the quiet layer.

8. The biaxially oriented polylactic acid film of claim 7, wherein the mineral is selected from talc, $CaCO_3$, or a mixture thereof.

9. The biaxially oriented polylactic acid film of claim 1, wherein at least one side of the film is discharge-treated.

10. The biaxially oriented polylactic acid film of claim 1, further comprising a first skin layer consisting essentially of polylactic acid.

11. The biaxially oriented polylactic acid film of claim 10, wherein the first skin layer is heat sealable.

12. The biaxially oriented polylactic acid film of claim 10, wherein the first skin layer has a thickness of 3 μm or less.

13. The biaxially oriented polylactic acid film of claim 1 further comprising a coextruded heat sealable first skin layer, wherein the first skin layer comprises amorphous polylactic acid and a polymer A1, wherein the following conditions hold:

$T_g(A1) \leq 0°$ C.

$10\% \leq wt \%(A1) \leq 40\%$ $60\% \leq wt \%(PLA1) \leq 90\%$ in which:
$T_g$ (A1) is the glass transition temperature of the biodegradable polymer A1 in the first skin layer,
wt % (A1) is a weight % of the biodegradable polymer A1 in the first skin layer,
wt % (PLA 1) is a weight % of amorphous polylactic acid in the first skin layer.

14. The biaxially oriented polylactic acid film of claim 13, wherein the biodegradable polymer A1 is selected from the group consisting of polyhydroxybutyrate-valerate, polycaprolactone, polybutylene-adipate-co-terephthalate, polybutylene-succinate, polybutylene-succinate-adipate, PH(R)A R=C2-C10 or mixtures thereof.

15. The biaxially oriented polylactic acid film of claim 13, further comprising a second coextruded skin layer on a side opposite of the first skin layer, wherein the second coextruded skin layer consists essentially of polylactic acid.

16. The biaxially oriented polylactic acid film of claim 15, wherein the film is lap sealable.

17. The biaxially oriented polylactic acid film of claim 15, wherein the second skin layer has a thickness of 3 μm or less.

18. The biaxially oriented polylactic acid film of claim 1, wherein the film is compostable based on ASTM D5883.

19. The biaxially oriented polylactic acid film of claim 1, wherein a total thickness variation in the TD of the film is less than 10%.

20. The biaxially oriented polylactic acid film of claim 1, wherein the film is a packaging film.

21. The biaxially oriented polylactic acid film of claim 1, wherein the film is metallized.

22. The biaxially oriented polylactic acid film of claim 21 in which the metallized film comprises aluminum as the metal layer.

23. The biaxially oriented polylactic acid film of claim 21 in which the metal is at 1.5 to 5.0 optical density.

24. A laminate comprising the biaxially oriented polylactic acid film of claim 1.

25. A laminate comprising the metallized film of claim 21.

26. The laminate of claim 24, wherein the laminate is compostable based on ASTM D5883.

27. The laminate of claim 25, wherein the laminate is compostable based on ASTM D5883.

28. A food packaging comprising the laminate of claim 24.

29. A food packaging comprising the laminate of claim 25.

* * * * *